US012367487B2

(12) United States Patent
Wagner

(10) Patent No.: US 12,367,487 B2
(45) Date of Patent: Jul. 22, 2025

(54) EFFICIENT AND SECURE BLOCKCHAINS USING CLOUD RESOURCE PRIMITIVES

(71) Applicant: Vendia, Inc., San Francisco, CA (US)

(72) Inventor: Timothy Allen Wagner, Seattle, WA (US)

(73) Assignee: Vendia, Inc., San Francisco, CA (US)

( * ) Notice: Subject to any disclaimer, the term of this patent is extended or adjusted under 35 U.S.C. 154(b) by 375 days.

(21) Appl. No.: 17/822,739

(22) Filed: Aug. 26, 2022

(65) Prior Publication Data
US 2023/0062434 A1 Mar. 2, 2023

Related U.S. Application Data

(60) Provisional application No. 63/261,936, filed on Sep. 30, 2021, provisional application No. 63/238,074, filed on Aug. 27, 2021.

(51) Int. Cl.
*H04L 9/00* (2022.01)
*G06F 16/23* (2019.01)
(Continued)

(52) U.S. Cl.
CPC ..... *G06Q 20/3825* (2013.01); *G06F 16/2379* (2019.01); *G06F 21/602* (2013.01);
(Continued)

(58) Field of Classification Search
None
See application file for complete search history.

(56) References Cited

U.S. PATENT DOCUMENTS

2018/0270244 A1 9/2018 Kumar
2018/0365686 A1 12/2018 Kondo
(Continued)

FOREIGN PATENT DOCUMENTS

WO WO 2023/028608 3/2023

OTHER PUBLICATIONS

U.S. Appl. No. 17/822,744, Efficient Execution of Blockchain Smart Contracts Using Cloud Resource Primitives, filed Aug. 26, 2022.
(Continued)

*Primary Examiner* — Jeffrey C Pwu
*Assistant Examiner* — Mayasa A. Shaawat
(74) *Attorney, Agent, or Firm* — Knobbe, Martens, Olson & Bear, LLP

(57) ABSTRACT

Systems and methods are disclosed for efficient creation of blocks on a blockchain by utilization of trusted cloud primitives. As opposed to inefficient mechanisms like proof-of-work or application-limited mechanisms like proof-of-stake, embodiments of the present disclosure implement a consensus algorithm by execution of verifiably immutable code on one or more hosted computing environments that are mutually trusted by participants to the blockchain. The code can be designated within a block of the blockchain, such that participants mutually trust the code, when executed, to properly implement the agreed-upon consensus algorithm. The consensus algorithm can operate to select transactions for inclusion in each block, and notify participants of the selection, removing a need for participants to trust one another with respect to block creation.

20 Claims, 10 Drawing Sheets

(51) Int. Cl.
  *G06F 21/60* (2013.01)
  *G06Q 20/38* (2012.01)
  *G06Q 20/40* (2012.01)
(52) U.S. Cl.
  CPC ....... *G06Q 20/3827* (2013.01); *G06Q 20/405* (2013.01); *H04L 9/50* (2022.05)

(56) References Cited

U.S. PATENT DOCUMENTS

| | | | |
|---|---|---|---|
| 2020/0082398 A1* | 3/2020 | Xu | ............................ H04L 9/50 |
| 2020/0099531 A1 | 3/2020 | Chidambaram | |
| 2020/0250747 A1* | 8/2020 | Padmanabhan | ...... G06Q 20/065 |
| 2020/0372167 A1 | 11/2020 | Wang | |
| 2021/0119768 A1 | 4/2021 | Han et al. | |
| 2021/0377045 A1 | 12/2021 | Doney | |
| 2023/0060916 A1 | 3/2023 | Wagner | |

OTHER PUBLICATIONS

International Search Report and Written Opinion for Application No. PCT/US2022/075547 dated Dec. 6, 2022, 22 pages.
Aswal, "What are Blockchain nodes?," Jun. 15, 2024, Retrieved from the Internet: URL: https://www.blockchain-council.org/blockchain/blockchain-nodes/.
International Preliminary Report on Patentability for Application No. PCT/US2022/075547 dated Feb. 27, 2024, 6 pages.

* cited by examiner

EFFICIENT AND SECURE BLOCKCHAINS USING CLOUD RESOURCE PRIMITIVES

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

Cloud service providers can provide computing resources in a variety of forms, which may be combined by users to provide desired functions or services. For example, a cloud provider can provide compute resources, like virtual machines, that conduct computation, block storage resources that act as virtual hard drives for compute resources, object storage services that act as network-accessible data stores, and the like. A cloud provider can further provide "control plane" functionalities, that control or configure other services (like compute services, storage services, or more complex services built on compute and storage services). For example, control plane functionalities can provide access control, including authorization and authentication services, configuration and versioning services, and monitoring and logging services. Clients may combine cloud services to provide a wide variety of computing functionalities via the cloud.

BRIEF DESCRIPTION OF THE DRAWINGS

Illustrative examples are described in detail below with reference to the following figures.

DETAILED DESCRIPTION

Figure 1:
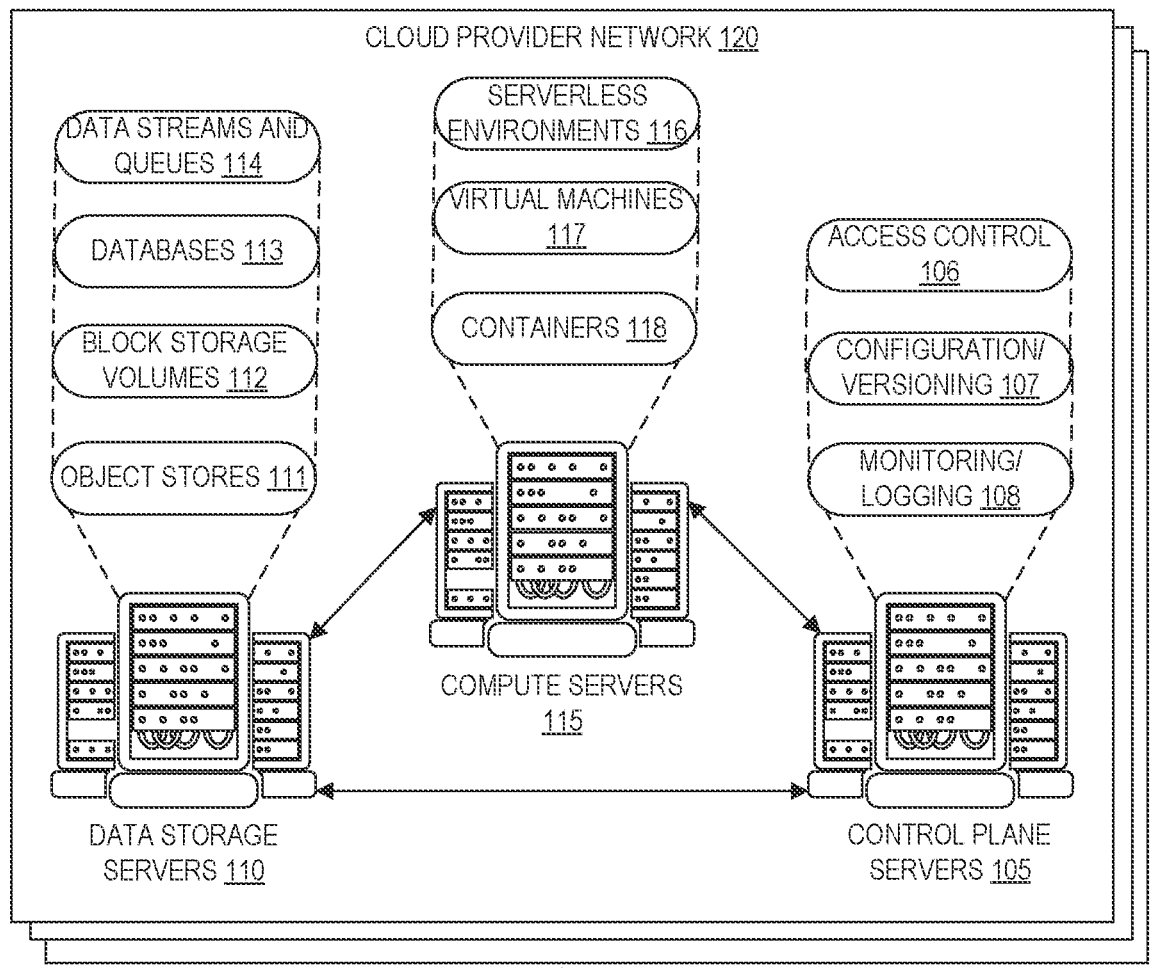
FIG. 1 depicts an example computing environment including one or more cloud provider networks in which embodiments of the present disclosure can be implemented.
Figure 1:
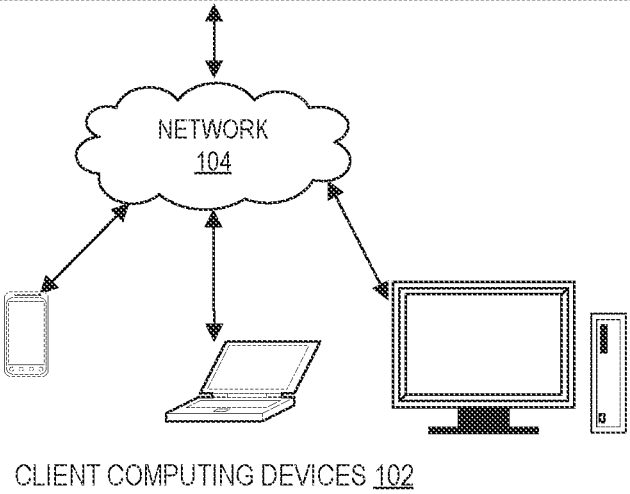

Aspects of the present disclosure relate to efficiently and securely implementing blockchains by utilizing cloud resources as "primitives" on which a blockchain can be built. As described herein, use of cloud resource primitives can alter a number of aspects of blockchain implementation, resulting in more efficient blockchains while maintaining key security benefits, such as a mutually understood trust model. Embodiments of the present disclosure further relate to use of a cloud-primitive blockchain to provide for data sharing between different cloud providers and/or different end users, providing resilient, secure, efficient, and agile data sharing between parties.

Generally described, a blockchain can represent a distributed ledger, in which transactions are represented within "blocks" of data that are "chained" in a manner that prevents or substantially inhibits retroactive alteration of transactions. An initial state of the ledger can be recorded in a first block. Thereafter, each transaction (which may include, for example, writing new data, modifying existing data, deleting existing data, etc., all of which may generally be described as entries in the distributed ledger) may be recorded within a subsequent block, with the subsequent block being cryptographically linked to a prior block, such as by including a cryptographic hash value of the prior block (or a subset of data of the prior block) in the subsequent block. Thus, each block in the blockchain can indicate a particular state of the distributed ledger. Due to inclusion of cryptographic hashes, it may be difficult or impossible to alter a block (or "link") in the chain without detection (e.g., by the cryptographic hash of an altered block not being properly recorded within a subsequent block). In this manner, an auditor may verify the state of the distributed ledger by obtaining the blockchain and "replaying" transactions from the first block to a current block, verifying that cryptographic hashes within the chain match those expected based on the transactions and verifying that the ledger matches state indicated by the transactions.

Due to the cryptographic links within blocks and other security measures—such as a mutually-agreed on consensus for when blocks are to be added to a chain, blockchains are often valued for their security. For example, different parties that do not trust one another may utilize a blockchain to record conveyance of assets, without requiring trust of any respective party to validate that conveyance. However, some aspects of past blockchains that ostensibly add security also significantly reduce these past blockchain's efficiency, resulting in excessive use of computing resources. For example, some past blockchains support "smart contracts," in which implementing a transaction includes execution of computer code corresponding to that transaction. To address lack of trust among participants, these past blockchains generally require each verifying party for the transaction to independently execute that computer code. Moreover, as use of such a blockchain grows, the number of verifying parties also grows. As a result—and somewhat paradoxically to typical operation of distributed computing systems—these blockchains become less and less efficient as they are adopted by more parties, consuming more and more resources to redundantly perform the same computation. As another example, many blockchains provide for ostensibly "zero trust" consensus in selecting which transactions to add to a new block, thus deciding what transactions are recorded in the distributed ledger. The consensus mechanisms used often require significant computing resources to ensure that creating new blocks is difficult. This enables blockchain users to consider a longest valid chain as authoritative, and prevents others from attempting to create a different authoritative branch by, for example, retroactively reversing an earlier transaction and creating new blocks of longer length than a current authoritative chain. This can create an "arms race" among participants, whereby more and more resources are required to create (or "mint") each block. Again, as a result, these blockchains become less and less efficient as they are adopted by more parties, consuming more and more resources to do the same computation.

Past blockchains ostensibly provide for "zero trust" security models, in which each actor need not trust any other actor. However, nearly any blockchain being practically implemented must nevertheless rely on primitives outside the algorithmic model itself that are implicitly trusted. For example, blockchains implemented on the Internet must generally assume that large amounts of Internet traffic are not being manipulated by a sufficiently powerful party. Similarly, blockchains implemented using consumer computing devices must generally assume that component manufactures for such computing devices, including processor manufacturers, memory and storage manufacturers, network interface device manufacturers, etc., are not designing such components in a way to subvert secure operation of the blockchain. Thus, a blockchain is typically not zero trust, but relies on a set of trust primitives. These primitives, in turn, factor into algorithmic operation of the blockchain, modifying how such chains operate. In this way, blockchains are typically "downward trust"-based, insomuch as participants trust the primitives on which the chain is built. Rather than allowing for "zero trust," blockchains in practice often simply avoid trust between participants (which may be referred to as "peer" trust or "sideways" trust).

Embodiments of the present disclosure provide for more efficient operation of a blockchain, while maintaining security and a trust model of such a blockchain (which may be sufficiently similar to or in some ways exceed security and trust models of existing blockchain implementations), by adopting cloud resources as trusted primitives. These cloud resources may include, for example, compute resources, storage resources, and control plane resources provided by a trusted cloud provider. Similarly to past blockchains, the blockchains disclosed herein may require each participant to place trust within a provider of primitives; trusting, for example, that a cloud provider is operating in a trustworthy manner, similarly to how traditional blockchains may trust that Internet Service Providers and component manufacturers are operating in a trustworthy manner.

Given such trust, many computational inefficiencies of past blockchains can be removed, without altering the security or trust model of a blockchain with respect to untrusted actors (e.g., other end users of the blockchain). For example, recall that "smart contracts" in past blockchains may require independent computation by each verifier, duplicating work and providing for increasing inefficiency as participation in such a blockchain grows. Where cloud resources are adopted as trust primitives, such inefficiency can be replaced by using a trusted cloud computation service to execute code of a smart contract once, in a manner verifiable to all parties. For example, a cloud service provider may provide a "serverless compute" service, which operates to execute a given set of code (a "serverless function") on-demand and provide a result. The provider may further provide for immutability of a set of code, such that once given an identifier (e.g., a name and version number) any request to invoke the set of code with that identifier always results in the same set of code being executed. Under these conditions, a smart contract may be embedded within a set of code submitted to the serverless compute service, and a block may be added to the blockchain to reflect execution of the code within the serverless compute service. The block may include sufficient information to later verify that the expected set of code was actually executed on the serverless compute service, such as the identifier of the set of code, authentication information for the set of code when executed on the serverless compute service, etc. In this manner, only a single execution of the set of code is required to execute the smart contract—because all parties to the blockchain "trust" the serverless compute service, a single execution of the code on the serverless compute service is sufficient to result in a trusted transaction on the blockchain. Accordingly, there is no requirement that each party independently execute the set of code, and the inefficiencies related to independent execution of code by each part is removed.

The use of cloud compute services as a trusted primitive can also address inefficiencies of past blockchain implementations relating to consensus. As discussed above, many existing consensus protocols rely on "proof of work", which uses large amounts of computation by multiple devices to create new blocks, with a new block created (for example) when a device identifies a particular combination of transactions and other data that satisfies a computationally difficult problem (e.g., having a hash value with a sufficient number of leading zero bits). Under this scheme, as devices join in the process of creating new blocks, the difficulty of the problem must be increased to maintain constant block creation cadence, and corresponding stability of the blockchain. As a result, the efficiency of the blockchain undesirably decreases as use of the blockchain increases. While alternatives to "proof of work" have been proposed, they are often limited in application. For example, a "proof of stake" paradigm places trust in a block creator according to how many "coins" in a cryptocurrency, associated with the blockchain, that the block creator holds. This paradigm is thus limited to specific blockchain applications (e.g., cryptocurrency).

In contrast to these block creation paradigms, embodiments of the present disclosure can provide for highly efficient block creation by utilizing a trusted cloud compute service primitive to conduct such consensus in a trusted manner. For example, a block creation algorithm can be implemented such that a transaction is added to a block of a blockchain when a sufficient number of parties (e.g., as a percentage of all parties, including potentially a unanimity requirement) vote to include such a transaction. A particular actor, such as a "consensus node" may be tasked with evaluating transactions, gathering votes from parties, and adding the transaction to a block (and thus to the blockchain) when the votes meet the requisite threshold. The consensus node may illustratively be implemented as a set of code on a cloud compute service, such as a serverless compute service, and may include whatever logic is agreed on between the parties (e.g., to validate transactions, properly collect and account for votes, etc.). As in the example of smart contracts, above, the set of code may be immutable on the compute service, and identified within the blockchain (e.g., within a first block). Thus, any party to the blockchain may audit the code to ensure correct operation, and may trust that execution of the code by the compute service results in an expected result. In this way, trust is maintained between the parties—none is required to trust the other—without requiring excessive computation in order to reach consensus as to which transactions are added to a blockchain.

Blockchains as disclosed herein may be used to store a wide variety of data. For example, the distributed ledger maintained via transactions on the blockchain may operate as a database storing information accessible to blockchain participants. The information in the distributed ledger may be considered "on chain," in that such information is directly derivable from data of the blockchain. To ensure such derivability, participants in the blockchain may agree to a specific information schema: a representation of the organization and format of information within the distributed ledger. For example, in a manner analogous to traditional databases, participants may agree on collections of data elements (e.g., tables) and a format of such data elements (e.g., with each element representing a "row" and containing one or more field values corresponding to "columns" in a table). In some embodiments, the distributed ledger may further support "off chain" or "chain adjacent" data. For example, the ledger may support inclusion of links or identifiers for other data accessible to participants, such as uniform resource identifiers (URIs) identifying data within a particular location on a network. In some embodiments, a blockchain system may provide for additional functionalities related to availability, accountability, and non-repudiation of such off chain or chain adjacent data hosted according to trusted cloud primitives. For example, a blockchain transaction may cause the data to be copied to a threshold number of blockchain participants implemented using trusted cloud primitives, such that the data is unlikely to be lost in case of failure of less than all participants. Blockchain transactions may further reflect transmission of data copies to various participants. Subsequent transactions may be used to manage the data as stored among the participants, including for example modification or deletion of the data. Because this data is not directly encoded within the blockchain, but may be managed via blockchain transactions in the same manner as on-chain data and provide a number of the same trust model guarantees as on-chain data, this data is therefore referred to herein as "chain adjacent" data. In contrast, other data not encoded within a blockchain, such as data that is linked to within a blockchain but not managed via the blockchain system, is referred to as "off chain" data. Use of off chain or chain adjacent data may enable, for example, sharing of large data sets between parties, without requiring that the entirety of such a data set be included within the block chain. In addition, off chain and chain adjacent data may not be required to conform to any particular format, enabling support for schema-less data via the blockchains discussed herein.

The data sharing provided by blockchains as disclosed herein may be used in a wide variety of applications in which multiple parties wish to exchange data in a secure, resilient, verifiable, and efficient manner. As one example, multiple parties to a supply chain may wish to track physical inventory as it passes between parties. While these parties may generally trust one another, disputes might arise when inventory does not pass smoothly between the parties, such as when inventory is lost or damaged. To address such disputes, these parties may utilize a blockchain according to embodiments of the present disclosure, with transactions of the blockchain indicating an agreed exchange of physical inventory. Each party may then consult the blockchain to verifiably identify the party responsible for inventory at a given point in time, without requiring trust in the other party's accounting for such inventory. This application therefore maintains the "zero trust" model of past blockchains, as between parties to the chain. But unlike past blockchains, the blockchains disclosed herein operate significantly more efficiently, reducing excessive computation associated with past blockchains.

The examples discussed herein generally (unless stated otherwise) assume a multi-party, permissioned, non-public blockchain with restricted membership, sometimes referred to as a federated blockchain or a blockchain consortium. However, embodiments may alternatively or additionally be applied to private and public blockchains. For example, assume a single party wishes to resiliently store a set of data among multiple cloud providers (e.g., to ensure that a disruption in one cloud provider does not remove access to that set of data). In accordance with present embodiments, the party might configure the set of data as a distributed ledger, and further configure two distinct "nodes": each acting as a participant to a private blockchain, and each being implemented on a distinct cloud provider network. Any modifications to the data may be recorded in transactions on the blockchain, which are replicated between the nodes according to operation of the blockchain. Thus, data within the ledger is programmatically replicated to both nodes, spanning the two cloud provider networks. Should one provider network fail, data can be retrieved at the other node without interruption. Accordingly, the party can be enabled to migrate and replicate data between locations without manually configuring such migration or replication.

In one embodiment, various characteristics of a blockchain, which may be referred to as "metadata" regarding the blockchain, may be stored within the blockchain itself. For example, the blockchain may identify (e.g., within a first block) metadata such as authorized participants to the blockchain (e.g., nodes representing actors), permissions of such participants (e.g., to add new participants), a schema for the distributed ledger (e.g., defining all or a portion of data stored in the distributed ledger, such as by arrangement, format, variable type, readability or writability, etc.), policies for amending that schema, identifying information for a consensus node (representing code executable to conduct consensus when adding blocks), policies for amending the consensus node, and policies for amending the metadata. Each transaction on the chain may include information sufficient to ensure compliance with this metadata. For example, each transaction may be signed with a "private key" of an authorized party who is identified in the metadata (e.g., via a public key, according to public/private key cryptography) as having permission to perform the transaction. Thus, by reading the blockchain and metadata embedded therein, an auditor (e.g., a party to the blockchain or an authorized third party) may verify the validity of each transaction recorded therein. In one embodiment, the metadata is mutable according to specific policies. For example, should a change to the consensus node be desired or required (e.g., as a software upgrade, change in cloud provider, etc.), such change may be processed by the prior consensus node as a transaction on the blockchain, thus ensuring continuity between the nodes and a verifiable, validated hand off between the nodes. Thus, all information required to verify a state of a distributed ledger may be included within the blockchain itself, providing for a wide amount of flexibility in the particular implementation of any blockchain without sacrificing security and verifiability.

As will be appreciated by one of skill in the art in light of the present disclosure, the embodiments disclosed herein improve the ability of computing systems to share data among multiple computing devices or parties. These embodiments provide for security and low shared trust among parties in a manner similar to past blockchains, while addressing the significant computational inefficiencies of such blockchains. Moreover, the presently disclosed embodiments address technical problems inherent within computing systems; specifically, the difficulty of securely, verifiably, and resiliently sharing data among potentially untrusting parties without incurring significant or excessive computational expense. These technical problems are addressed by the various technical solutions described herein, including the use of cloud resources as primitives for blockchain operations, such as the use of trusted cloud compute services to provide computation related to blockchain (e.g., in implementing consensus and smart contracts), and the configuration of a blockchain to include metadata reflecting the configuration of the blockchain, thus enabling a wide variety of blockchain configurations while maintaining verifiability as to transactions on the blockchain. Thus, the present disclosure represents an improvement on computing systems utilizing blockchains and computing systems in general.

The foregoing aspects and many of the attendant advantages of this disclosure will become more readily appreciated as the same become better understood by reference to the following description, when taken in conjunction with the accompanying drawings.

FIG. 1 depicts an example computing environment 100 including one or more cloud provider networks 120 in which embodiments of the present disclosure can be implemented. The cloud provider networks 120 can be accessed by client computing devices 102 over a network 104. A cloud provider network 120 (sometimes referred to simply as a "cloud"), refers to a pool of network-accessible computing resources (such as compute, storage, and networking resources, applications, and services), which may be virtualized or bare-metal. A cloud provider network 120 may also be referred to as a hosted computing environment. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud provider network 120 includes one or more data storage servers 110, and one or more compute servers 115, and one or more control plane servers 105 that are in networked communication with one another and with the network 104 to provide users with on-demand access to computing resources such as databases 113, block storage volumes 112, object stores 11, serverless environments 116, virtual machines 117, containers 118, access control services 106, configuration and versioning services 107, and monitoring and logging services 108, among others. These particular resources are described in further detail below. Some implementations of cloud provider network 120 can additionally include other services (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions. While one illustrative set of resources is shown in FIG. 1, the particular set of resources provided by a cloud provider network 120 may vary, and these resources may vary across different networks 120.

Each cloud provider network 120 can provide on-demand, scalable computing platforms to users through the network 104, for example allowing users to have at their disposal scalable "virtual computing devices," also known as "virtual machines," via their use of the data storage servers 110 and compute servers 115. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Turning specifically to the roles of the different servers within the cloud provider network 120, the compute servers 115 include one or more servers which provide computing capacity to users for building and hosting their software systems. The compute servers 115 and associated control plane functionality can provide an elastic compute cloud service of the cloud provider network. Various different forms of compute service may be provided. For example, the compute services 115 may provide for serverless code execution via serverless environments 116. Serverless computing is known in the art, and thus will not be described in detail herein. However, in general, a serverless compute service can enable a user to provide executable code to the cloud provider network 120 (potentially with other supporting data or software, such as libraries, utilities, runtimes, etc.), and later request execution of that code. The cloud provider network 120 may manage storage of the code, such as in object stores 111 (discussed in more detail below). The cloud provider network 120, in response to a requested execution, may generate a serverless environment 116, which may itself be a virtual machine or software container, provision the environment with the code, and execute the code within the environment. Because the cloud provider network 120 handles aspects such as creation of the environment, provisioning of the environment with the requisite data (e.g., the code), and later destruction of the environment, an end user is not required to specifically configure a server to support that execution. Accordingly, such functionality is referred to as "serverless" computing (though, of course, execution nevertheless occurs on a server). While direct submission of code is one example of serverless computing, others are possible. For example, serverless network services may provide for "orchestration" enabling a user to create workflows, processes, or other automation in a "low code" or "no code" environment, such that the workflow, process, or automation is then invokable on demand. Such workflows, processes, or automations are sometimes referred to as "step functions" or "logic apps." Because end users are enabled to execute functionality on-demand without user-provisioning of resources supporting such execution, these services enabling creation and on-demand invocation of such workflows, processes, or automations are also encompassed within the term "serverless" and "serverless computing" as used herein.

As another example of compute service, the cloud provider network 120 may enable end users to directly configure, access, and maintain execution environments, such as virtual machines 117 and software containers 118. Both virtual machines and software containers are generally known in the art, and thus will not be described in detail herein. However, in brief, both virtual machines and software containers provide for virtualization of resources, which provides isolation of software executing within the environment from software executing in other environments. Virtual machines represent virtualized hardware, and are thus in some contexts referred to as "system virtual machines" providing "full virtualization." A virtual machine may thus support installation of an operating system in a similar manner to a non-virtualized (physical) computing device. A software container, in contrast, provides operating-system level virtualization, which utilizes an operating system of a host device (which may be a physical device or a virtual machine) to enable execution of code within the software container while isolating that execution for other code executing on the host device. In some embodiments, a cloud provider network 120 may also enable end users to directly access and utilize certain compute servers 115 without virtualization. These may be referred to as "bare metal" instances, and provide yet another type of compute service.

In addition to compute servers 115, the cloud provider network 120 includes data storage servers 110, which provide a variety of types of data storage, such as data streams and queues 114, databases 113, block storage volumes 112, and object stores 111.

One type of storage provided by data storage servers 110 is data streams and queues 114. Generally described, both a data stream and a data queue represent a location for storing a set of data that can change over time. For example, within a stream, new data may be continuously created and added to the stream, and old data may be removed (e.g., after a set period, after the set reaches a certain size, etc.). A data queue may operate similarly to a stream, with for example different additional and removal criteria. For example, within a queue, data may be removed once transmitted to or processed by a consuming device. Data streams and queues may be ordered or unordered.

Another type of storage provided by data storage servers 110 are databases 113. Databases 113 can represent any number of a wide variety of known database technologies providing for organized collection of data. Databases 113 may include relational databases, non-relational databases, transactional databases, analytical databases, and the like.

Client devices 102 may thus interact with databases 113 (and associated control plane functionality) to store, search for, and retrieve a wide variety of data.

Block storage volumes 112 provide another type of storage service, by providing persistent data storage for the compute servers 115 in the form of block storage volumes 112, each of which represents a virtualized, network-accessible block-storage device (e.g., a virtual "hard disk"). Block storage may be referred to in various implementations as cloud disks service, a managed disk service, a storage area network service, a persistent disk service, or a block volumes service, while block storage volumes may variously be referred to as cloud disks, storage disks, cloud volumes, disks, block volumes, or simply "volumes." The block store servers 105 and associated control plane functionality can provide an elastic block store service of the cloud provider network 120. Data of volumes 112 may be encrypted or unencrypted. Network-accessible block-storage devices may in some cases be end-user-accessible, for example by acting as a virtual disk drive for a virtual machine 117

Yet another type of storage service is provided by object stores 111. The data storage services and associated control plane functionality can utilize object stores 111 to provide an object-based storage service of the cloud provider network. Object-based storage services can be referred to as a blob storage service, cloud object storage service, or cloud storage service, in various implementations. In contrast to block-based storage (e.g., where devices read and write fixed-length blocks identified by a location, such as a logical block address (LBA)), object stores 111 facilitate storage of variable-length objects associated with a corresponding object identifier. Each object may represent, for example, a file submitted to the servers 110 by a user for storage (though the servers 110 may or may not store an object as a file). In contrast to block-based storage, where input/output (I/O) operations may typically occur via a mass storage protocol, such as serial ATA (though potentially encapsulated over a network), interactions with object stores 111 may occur via a more general network protocol. For example, the servers 110 may facilitate interaction with object stores 111 via a Representational State Transfer (REST) application programming interface (API) implemented over the Hypertext Transport Protocol (HTTP). The object stores 111 may store objects within collections, sometimes referred to as "buckets." Each object typically includes the data being stored, a variable amount of metadata that enables various capabilities for object stores 111 with respect to analyzing a stored object, and a globally unique identifier or key that can be used to retrieve the object. Objects stored in the object stores 111 are associated with a unique identifier, such that authorized access to them can be obtained through requests from networked computing devices in any location. Users can store as many objects as desired within object stores 111, can write, read, and delete objects in object stores 111, and can control access to their objects contained therein. In some embodiments, data storage servers 110 are configured to provide for immutability of objects within the object stores 111, such that modification of an object is not possible. For example, the servers 110 may accept instruction to designate an object as immutable, and thereafter decline an instruction to modify an object designated as immutable, or interpret such an instruction as a request to store a new object representing a modification of the immutable object. Moreover, data storage servers 110 are in some embodiments configured to provide for non-deletion of objects within the object stores 111. For example, the servers 110 may accept instruction to designate an object as deletion-free, and thereafter decline an instruction to delete the object. In some instances, immutability, deletion-free designation, or both may be associated with a time period, such that the servers 110 ensure this designation for a minimum period of time that is not modifiable by a client after initiation. As discussed below, immutability and deletion-free guarantees may form cloud primitives enabling various functionalities of a blockchain.

In addition to data storage servers 110 and compute servers 115, the cloud provider network 120 further includes control plane servers 105. Control plane servers 105 can general implement "control plane" functionality, which typically refers to configuration or control of how data flows, as opposed to actual data flow (which is sometimes referred to as "data plane"). For example, the control plane servers 105 may provide interfaces enabling a client, via a client computing device 102, to create, configure, or maintain other cloud resources, such as virtual machines 117, containers 118, databases 113, block storage volumes 112, or the like. In some configurations, specific cloud resources may not be directly configurable by clients. For example, clients may be unable to directly manage serverless environments 116 or object stores 111, but may interact with those environments 116 or stores 111 via respective cloud services (e.g., a serverless compute service or object storage service, either of which may be implemented as code executing within a virtual machine 117, utilizing storage of block storage volumes 112, etc.).

In addition to enabling creation or access to cloud resources, control plane servers 105 may provide functionalities such as access controls 106, configuration and versioning 107, and monitoring and logging 108. Illustratively, access controls 106 may enable a client to specify particular parties that can access various cloud resources, as well as permissions related to that access. Access controls 106 may additionally enable authentication of or related to cloud services. For example, each compute instance (e.g., a serverless environment 116, virtual machine 117, or container 118) may be associated with authentication information indicating a client associated with that compute instance (e.g., on behalf of which the instance is executing code). Accordingly, any operations conducted by a compute instance may be verifiably linked to a particular client conducting such operations. Additionally, configuration and versioning services 107 may enable an end user to configure specific resources, such as editing the resource, naming the resource, etc., while providing versioning for such resources, such as by associating each configuration with a particular version identifier. Monitoring and logging services 108 may enable an end user to monitor cloud resources and obtain log information regarding such resources, thus gaining visibility into operation of such resources.

In accordance with embodiments of the present disclosure, cloud resources such as those shown in FIG. 1 may be utilized to implement an efficient and secure blockchain. For example, each participant in a blockchain may utilize a combination of cloud services (e.g., compute and storage services) to create one or more "nodes" acting as participants in the blockchain. The cloud services may for example be directly implemented by a client, implemented by an intermediary service provider (sometimes referred to as a "Software as a Service" or SaaS provider), or a combination thereof. (Client computing devices 102 may additionally or alternatively act as such nodes.) In addition, the cloud provider network 120 may provide for computation supporting operation of the blockchain, which computation may not be controlled by any individual participant but instead trusted mutually by the participants. For example, a cloud provider network 120 may implement a consensus node that accepts transactions from participants, verifies such transactions, and writes such transactions to the blockchain in a resilient manner. In one embodiment, the consensus node is a transient node, representing a collection of on-demand resources of the cloud provider network 120, as opposed to statically allocated resources. For example, a given blockchain may be associated with a data queue 114 that stores proposed transactions for the chain. The cloud provider network 120 (e.g., a serverless compute service provided by the network 120) may be configured to invoke one or more serverless functions, within serverless environments 116, on existence of proposed transactions within the queue 114, to process such transactions and (if appropriate) add the transactions to the blockchain. Thereafter, execution of the serverless function may cease until new transactions are added to the queue 114. Thus, a consensus node may represent a transient logical element implemented by, e.g., compute servers 115, rather than a statically allocated device.

In accordance with embodiments of the present disclosure, the cloud provider network 120 may provide for certain sets of code, executable on the compute servers 115, to be verifiably immutable. For example, the cloud provider network 120 may enable sets of code submitted for execution on a serverless compute service (e.g., within a serverless environment 116) to be set, either manually or automatically, as immutable. This immutability may be guaranteed by a cloud provider, such that the code cannot be altered in any way without such change being apparent to a reviewer of the code. For example, the provider network 120 may identify each version of a set of code with a distinct version identifier, such that a given version identifier always and immutably refers to a given set of code, even if that code is later changed (and thus identified under a different version identifier). As disclosed herein, verifiable immutability can provide for efficient blockchain implementations, as compute tasks required by a blockchain can be provided via verifiably immutable code and via a trusted serverless environment 116 (e.g., provisioned and under control of a cloud provider, and not a party to a blockchain). In accordance with embodiments the present disclosure, execution of verifiably immutable code by a trusted cloud provider can enable efficient implementation of blockchains while removing inefficiencies associated with duplicated efforts that are typical of many past blockchain implementations. For example, code executable to implement a consensus node may be established as verifiably immutable, and an identifier of such code may be stored within a blockchain. In this way, operation of the consensus node can be verified by any party to the blockchain, or by an authorized third party. Moreover, utilization of verifiably immutable code by a trusted cloud provider to implement blockchain functionality such as consensus can avoid the need for excess computation that provides other security guarantees in existing blockchain implementation, such as providing Byzantine Fault Tolerance. Rather, because consensus or other functionality can be implemented by a mutually trusted third party, code of each participant need not be trusted by other participants (or even the participant itself). Similarly, code executable to implement smart contracts may be set as verifiably immutable, and transactions related to execution of such smart contracts may include information authenticating the transaction as a result of execution of the code representing the smart contract (e.g., information verifying that the expected code was executed by the compute servers 115). As a result, smart contract code may be executed once by the compute servers 115, and a result may be trusted by all parties (or a third party), without requiring each party to individually execute such code.

As illustrated in FIG. 1, the cloud provider network 120 can communicate over network 104 with client computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein.

Client computing devices 102 can include any network-equipped computing device, for example desktop computers, laptops, smartphones, tablets, e-readers, gaming consoles, and the like. Clients can access the cloud provider network 120 via the network 104 to view or manage their data and computing resources, as well as to use websites and/or applications hosted by the cloud provider network 120. While shown as distinct in FIG. 1, elements of the cloud provider network 120 may also act as clients to other elements of that network 120. Thus, a client device 102 can generally refer to any device accessing a network-accessible service as a client of that service.

Figure 2:
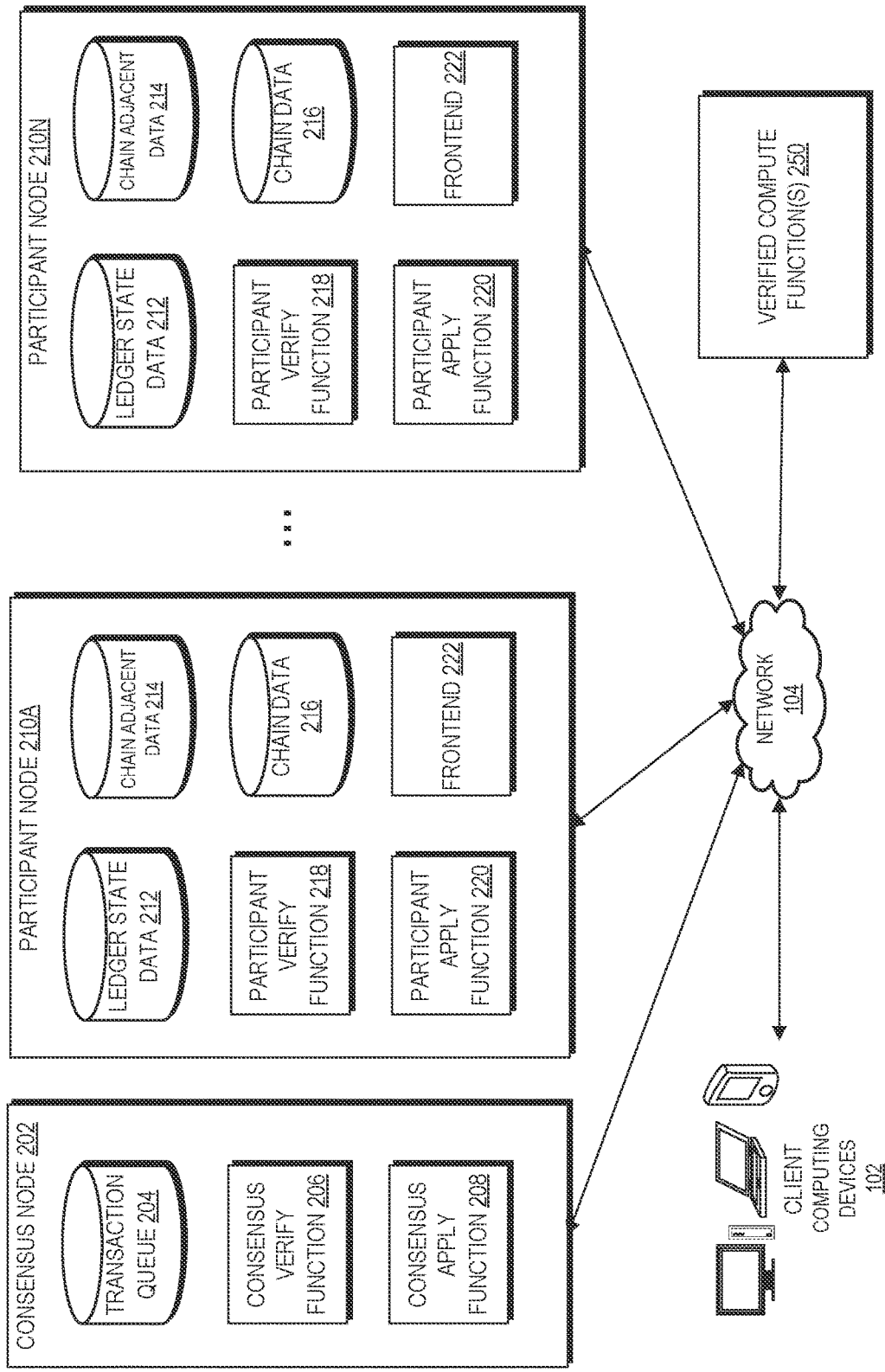
FIG. 2 depicts a computing environment in which a blockchain system using cloud resource primitives is implemented on one or more cloud provider networks in accordance with embodiments of the present disclosure.

FIG. 2 depicts a computing environment in which a blockchain system 200 using cloud resource primitives is implemented on one or more cloud provider networks 120. The blockchain can enable multiple parties, each associated with one or more participant nodes 210 (shown in FIG. 2 as nodes 210A-N), to share information and conduct transactions in a secure, efficient, resilient, and verifiable manner. Specifically, each party desiring to form a blockchain may implement a participant node 210. In one embodiment, a participant node 210 may be implemented as a collection of resources on a cloud provider network 120. For example, a client computing device 102 may interact with a cloud provider network 120 (e.g., a network-accessible service implemented on a cloud provider network 120) to "spin up" a participant node 210 by initializing resources corresponding to that node. In one embodiment, participant nodes operate on a "Single-tenanted Accounts with Multi-tenanted Infrastructure" ("STAMTI") model. Specifically, each node 210 may be associated with a particular single tenanted account on a cloud provider network 120, such that various account-specific resources (e.g., databases, data objects, compute instances, serverless functions, etc.) can be restricted on the cloud provider network 120 according to access controls specified by an owner of the account. The particular lower-level infrastructure implementing each of the account-specific resources (e.g., the data storage servers 110, compute servers 115, and control plane servers 105, along with multi-tenanted network services build on those servers) may be multi-tenanted, in that they serve multiple accounts (each representing a "tenant"). In one embodiment, creation of participant nodes 210 may be facilitated by a network-accessible service implemented on a cloud provider network 120, which service may be under control of an operator of the cloud provider network 120 or under control of another party. For example, a third-party operator may provide a network-accessible service through which a user can request creation of a participant node 210 implementing a blockchain, and invite other users to similarly request creation of a node 210 joining in operation of the blockchain. In response, the third-party service may (via interaction with relevant endpoints of the cloud provider network 120) create a participant node 210 on behalf of each user (e.g., by creating resources on the network 120 that collectively implement functionality of the node 210), associated with an account of the user on the cloud provider network 120. Due to association of each participant node 210 to an account of a user on the cloud provider network 120, there is no requirement in this model that users trust a third-party service creating such nodes 210. Rather, each user may trust, on the basis of security provided by the cloud provider network 120, that account-level resources associated with a participant node 210 are accessible only to client computing devices 102 properly authenticated to an underlying cloud provider network 120 under an account associated with the node 210. In one embodiment, the participant nodes 210 for a given blockchain are established in different cloud provider networks 120. For example, each party may have a pre-existing relationship with a cloud provider, and thus elect to implement a participant node 210 in the network 120 of that cloud provider 120. In some instances, a single party may be associated with multiple participant nodes 210. For example, a single party may implement two nodes 210 in two different cloud provider networks 120, thus providing resiliency among the networks 120. Similarly, a single party may implement two nodes 210 associated with different accounts on a given cloud provider network 120, or otherwise differentiated within a cloud provider network 120 (e.g., by implementing two nodes 210 in different "regions" or "availability zones" designating different subsets of resources within a network 120). Utilization of different provider networks 120 or different subsets of resources within a network 120 may provide a variety of benefits, such as fault tolerance, increased connectivity (e.g., lower latency) with other resources, accessibility to provider-specific functionalities, or the like. While discussed herein with reference to cloud-provided participant nodes 210, in other embodiments a user may configure a participant node 210 independently of the cloud provider networks 120. For example, an end user may use a client computing device 102 to create an "on-premises" participant node 210.

As shown in FIG. 2, each participant node 210 includes a frontend 222, chain data 216, chain adjacent data 214, a participant verify function 220, a participant apply function 220, and a ledger state data 212.

The ledger state data 212 illustratively represents a materialized view of information recorded within the blockchain, sometimes referred to as a "world state." As noted above, a blockchain can generally represent a distributed ledger, beginning at an initial state and recording transactions that modify that state. Because each transaction modifies state based on prior transactions, a node 210 can maintain ledger state data 212 that reflects a state on the blockchain at a given point, designated for example as a "block height" or "block number". For example, if a blockchain is implemented in a supply chain context, the ledger state data 212 may reflect inventories of each participant in the supply chain as of a given point. In one embodiment, the ledger state data 212 maintains a current view, reflecting a most recent block known to a participant node 210. Additionally or alternatively the ledger state data 212 may maintain other materialized views representing other points in the blockchain, and potentially a materialized view for all points on the chain. For example, multiple world states may be maintained in a database that supports versioning, with each transaction that modifies a data object modifying a corresponding versioned entry in the database. The ledger state data 212 may illustratively be implemented on a database 113, storing information according to the schema defined for a blockchain. As discussed below, this schema may vary according to the blockchain being implemented. For example, the schema may be initially defined within an initial block of a blockchain, and potentially altered via subsequent transactions reflected in subsequent blocks of the blockchain.

Data representing transactions on the blockchain may be stored within chain data 216, which may for example represent another database 113 (or another portion of the same database 113 used to store the ledger state data 212). When initializing the blockchain, a first block may be stored within chain data 216 that includes initialization information for the blockchain. This initialization information may include, for example, blockchain metadata designating participant nodes 210, identifying information for the consensus node 202 (discussed in more detail below), schema information detailing the type and format of data stored within the blockchain, permissions information, and the like. The initialization information may further include initial values for various data elements (sometimes referred to as "data objects"), such as inventory amounts for items to be transacted on via the blockchain. As transactions are recorded to the blockchain, each participant node 210 can make corresponding alterations to their chain data 216 recording those transactions. In this manner, the chain data 216 represents each participant node 210's understanding of the blockchain. As noted above, each transaction may be cryptographically linked to a prior transaction, such that transactions are not retroactively editable without breaking cryptographic continuity in the chain. Accordingly, each party may verify (or recreate) the ledger state data 212 by reference to the chain data 216. In some embodiments, one or more blocks of the chain data 216 may be cryptographically signed by participant nodes 210 to provide additional security and trust guarantees. For example, each participant 210 voting in favor of adopting a set of transactions to be reflected in a block may provide a digital signature to be included within that block, providing for both non-repudiation and a co-mutual guarantee of consistency and authenticity among the ledgers of the different participants. Absent failure scenarios (or differing permissions to on-chain or chain-adjacent data, as discussed herein), it is generally expected that chain data 216 is synchronized between all participant nodes 210.

In addition to chain data 216, each participant node 210 may include chain adjacent data 214. For example, chain adjacent data 214 may be stored as objects within object stores 111. Unlike chain data 216, chain adjacent data 214 is not directly encoded within transactions of a blockchain. However, in accordance with embodiments of the present disclosure, chain adjacent data 214 may be shared among participant nodes 210 and managed via operation of the blockchain. For example, to share chain adjacent data 214 from one participant node 210 to another, a sharing node 210 may propose a transaction on the blockchain that reflects, for example, a location of the chain adjacent data 214, access credentials for the chain adjacent data 214, and the like. A receiving node 210 may, as part of verifying the transaction, obtain the chain adjacent data 214 from the specified location using the specified access credentials, and verify receipt of the chain adjacent data 214 within the transaction or a subsequent transaction. Thus, operation of the blockchain may facilitate sharing of both on chain and chain adjacent data. Off-chain data, which may not be directly managed via operation of the blockchain, may be similarly shared among participants via transactions. In one embodiment, on-chain data includes scalar data, e.g., individual values of a specific type, as specified within a schema of a blockchain, and chain adjacent data includes any variety of data, unrestricted by that schema. For example, on-chain data sharing may be used to share relatively small amounts of information (e.g., on the order of bytes, kilobytes, megabytes, etc.), while chain adjacent data sharing may be used to share relatively large amounts of information (e.g., on the order of gigabytes, terabytes, etc.). Moreover, by providing for both on-chain and chain adjacent data, each participant node 210 may be provided with multiple mechanisms to obtain data. Illustratively, an account of a participant node 210 may be associated with computing resources otherwise configured to interact with a non-chain data store (e.g., with an object store 111 supporting non-chain data). Thus, an end user may utilize such a non-chain data store as the chain adjacent data store 214, and elect to continue to store data within the chain adjacent data store 214, rather than directly include the data as on-chain data, to facilitate continued use of these other computing resources.

To facilitate transactions on the blockchain, each node 210 can include a frontend 222 that accepts proposed transactions from a party associated with the node 210 (e.g., via a client computing device 102). For example, the frontend 222 may provide a standardized interface, such as a graphical user interface (GUI), application programming interface (API), command line interface (CLI), message queue, or the like, through which transactions are proposed to modify the distributed ledger. The interface may further enable querying of (reading of) information of the participant node 210, such as information within ledger state data 212, chain data 216, chain adjacent data 214, etc. Illustratively, reading a data object may include retrieving a value of a certain variable or field defined within a blockchain's schema. In one embodiment, the interface is a representational state transfer (REST) compliant interface (a "RESTful" interface). In another embodiment, the interface provides a GraphQL interface enabling submission of queries and mutations (modifications). Illustratively, the GraphQL interface may be generated by reference to the schema reflected in the blockchain, such as by use of a schema-to-GraphQL compiler. In yet another embodiment, the interface is a data manipulation language interface, such as an interface supporting authoring or submission of Structured Query Language (SQL) statements. The frontend 222 may illustratively handle queries by reference to the ledger state data 212, chain data 216, or chain adjacent data 214, such as by conducting the query and returning a result indicated by the respective data. The frontend 222 may illustratively handle proposed transactions by submitting the transaction to the consensus node 202 for potential addition to the blockchain. In some embodiments, the frontend 222 conducts initial validation for a proposed transaction, such as verifying that the transaction conforms to a present schema of a ledger, that the transaction does not render the ledger in a disallowed state (e.g., where a transaction is a request to transfer inventory, that a party has sufficient inventory for the transaction), that a party has requisite authorization to conduct the transaction, has been correctly authenticated, etc. The frontend 222 may thus act as an input and output point for reading from and writing to the blockchain.

A participant node 210, after accepting a transaction, may propose the transaction for inclusion on the blockchain by submitting the transaction to a transaction queue 204 corresponding to the consensus node 202, which may for example represent a data queue 114 of a cloud provider network 120. Each transaction may include details of proposed modifications to a present ledger state, along with information validating the transaction, such as a digital signature of a proposing participant node 210, and potentially of an end user (e.g., a client computing device 102 or entity using that device 102) that submitted the transaction to the proposing participant node 210. To validate a transaction, the consensus node 202 may implement a consensus verify function 206, which proposes the transaction to each participant node 210. Each participant node 210 may accept a proposed transaction at a participant verify function 218, which may verify the transaction and produce a vote of whether or not to accept the transaction. For example, each participant node 210 may validate the transaction according to their respective ledger state data 212 and confirm that the transaction is valid and permitted.

In some embodiments, each participant verify function 218 is the same among nodes 210, implementing validation according, for example, to blockchain metadata. Illustratively, each node 210 may utilize a common set of code, such as a verifiably immutable serverless function agreed to, e.g., by participant nodes 210 (and potentially identified within blockchain metadata included in the blockchain), to implement the verify function 218. Beneficially, using a common set of code among nodes 210 may reduce possibilities for 'corrupted code', limiting attack vectors and reducing reliance on Byzantine Attack-resistant coding requirements for the verify function 218. In other embodiments, participant verify functions 218 may vary among nodes. For example, individual nodes 210 may implement participant-specific code as respective verify functions 218. In either instance, implementation of verify functions 218 may vary among participants according to data available at a participant node 210. For example, each function 218 may review ledger state data 212 to determine whether or not to vote to approve a transaction. As another example, one or more verify functions 218 may enable specification of user-specific policies for evaluating transactions, specifying, e.g., rules for which transactions to accept or decline. A function 218 may therefore reference such rules in evaluating a proposed transaction. In this manner, individual participants may control how their nodes 210 vote on proposed transactions.

Thereafter, the consensus node 202, via the consensus verify function 206, may verify that a sufficient number of positive votes from participant nodes 210 have been collected to apply the transaction (or set of transactions). The number of positive votes may be controlled, for example, based on metadata of the blockchain, which may specify a threshold for voting, such as a requirement for unanimity. If sufficient votes have been collected, the consensus apply function 208 can be invoked to apply the transaction to the blockchain. In some embodiments, the consensus apply function 208 may include transmitting an indication to each participant apply function 220 to implement the transaction (or set of transactions). The participant apply functions 220, in turn, can modify the chain data 216 and ledger state data 212 within their respective node 210, as appropriate, to implement the transaction (or set of transactions). Illustratively, modification of chain data 216 can include adding a new block to the blockchain, while modification of the ledger state data 212 can include updating a materialized view of the distributed ledger as appropriate, such as by updating a current state of the ledger to reflect the effect to the current state of applying transactions included in new block. For example, the functions 220 may modify the ledger state data 212 to implement the transaction and add a new block recording the transaction to the chain data 216.

In some instances, the apply functions 220 may take additional actions. For example, if a transaction involves the transfer of chain adjacent data, the apply function 220 of a node 210 of a receiving participant may obtain the chain adjacent data reflected in the transaction and store that data in the chain adjacent data store 214 of that node 210. Taken collectively, the participant verify function 218 and participant apply function 220 implement "2-phase commit" protocol with respect to transactions, whereby transactions are evaluated at the verify function stage 218 and then committed at the apply function 220 stage.

In some instances, the consensus apply function 208 may undertake additional actions to apply transactions. For example, where a transaction includes the addition of a new participant node 210, the apply function 208 may communicate with that new node 210 to indicate acceptance into the group of participating nodes. As another example, where a transaction includes a smart contract that is implemented by a verifiably immutable set of code corresponding to a verified compute function 250, the consensus apply function 208 may invoke verified compute function 250. The consensus apply function 208 may await a result of the verified compute function 250, and include that result within the transaction details to be applied by each participant 210. In some embodiments, the verified compute function 250 may include sufficient information in a result to authenticate the function 250 as having executed the verifiably immutable set of code, such as by including a digital signature (e.g., of a cloud provider network 120 hosting the function 250) within the result.

While described here in the context of a consensus apply function 206, in some embodiments a verified compute function 250 may be additionally or alternatively invoked by the consensus verify function 206, e.g., with a result of such function 250 included within the proposed transaction processed by participant verify functions 218. Moreover, in some embodiments it may be expected that execution of a verified compute function 250 would undesirably delay creation of blocks, and thus that execution may occur asynchronously with respect to block creation. For example, the consensus apply function 208 may invoke a verified compute function 250 prior to submitting a transaction for application by participants 210, and the verified compute function 250 may be configured to return a result to the transaction queue 204 as a subsequent transaction, processed, e.g., in the manner described above. In this manner, it may be possible to execute even long running smart contracts, without delaying continuation of the blockchain. In some embodiments, a smart contract may place conditions of acceptability of a result from a verified compute function 250. For example, a condition may be that a result is returned within a specified time period (e.g., a time-to-live, or TTL, for the function) or the result is returned in a signed manner, such that each participant can verify it results from the verified compute function 250. In some instances, conditions may be ledger-state specific. For example, a particular smart contract that alters an inventory associated with a given item may conditioned on the inventory for that item not changing during the course of smart contract execution, maintaining a value above a threshold amount, etc.

As will be appreciated in view of the above, the consensus node 202 and participant nodes 210 may collectively implement a secure, verifiable blockchain of transactions, thus enabling data sharing among participants. Moreover, processing of transactions on such a blockchain, including the implementation of smart contracts, need not incur the inefficiencies of past approaches. For example, smart contracts may be implemented via a single execution of a verified compute function 250, without requiring each participant node 210 to redundantly execute code of the smart contract. Similarly, consensus may be carried out by a trusted consensus node 202, without requiring computationally inefficient consensus protocols such as the proof of work approach and without requiring a particular blockchain implementation, such as cryptocurrency, as in the proof of stake approach. Relative to other permissioned, private blockchains, embodiments disclosed herein provide highly efficient implementation strategies, as the use of cloud resources that are effectively unbounded eliminates the challenges of running out of storage in a fixed capacity system and enables use of massive parallelism by processing transactions within a block (and potentially multiple blocks known not to conflict with one another) in parallel, where such parallelism utilizes multiple underlying servers, unlike other approaches that may be by construction limited to the processing capabilities of a single server. This approach thus maintains key benefits of blockchains while addressing significant detriments of past approaches.

While the consensus node 202 is shown in FIG. 2 as a distinct node, it may in some embodiments be implemented in conjunction with a participant node 210. For example, a given participant 210 may host a transaction queue 204, consensus verify function 206, and consensus apply function 208 on behalf of the blockchain. The verify function 206 and apply function 208 may be verifiably immutable and identified within the blockchain, thus avoiding any issue of trust when such functions are hosted by a participant. Transactions within the transaction queue 204 may be required to be digitally signed by a proposing entity, thus avoiding issues of trust when the queue 204 is hosted by a given participant. In some embodiments, multiple participants 210 may each host such a queue 204, verify function 206, and apply function 208. Illustratively, participant nodes 210 may periodically conduct leader election, according to any of a variety of known leader election protocols, to elect a participant node 210 to act as a consensus node 202.

Figure 3:
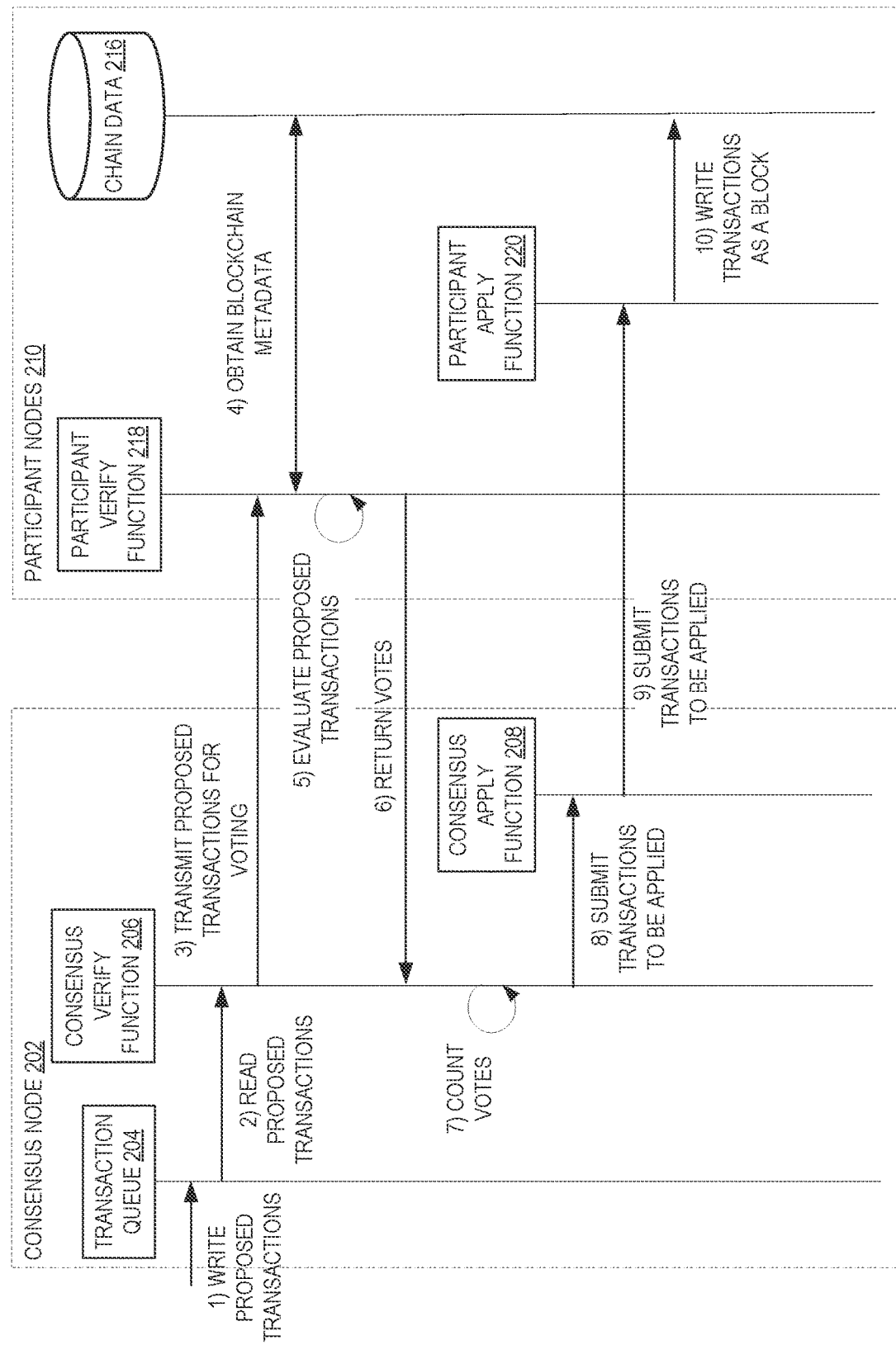
FIG. 3 depicts example interactions for implementing efficient, secure, and resilient writes to a blockchain among potentially untrusted actors, utilizing a consensus node implemented via trusted cloud resource primitives, in accordance with embodiments of the present disclosure.

With reference to FIG. 3, illustrative interactions will be described for implementing efficient, secure, and resilient writes to a blockchain among potentially untrusted actors, utilizing a consensus node 202 implemented via trusted cloud resource primitives. The interactions of FIG. 3 may occur, for example, when a participant to a blockchain proposes a write to the blockchain, such as by submitting a proposed write to a frontend 222 of a participant node 210.

The interactions begin at (1), where one or more proposed transactions are written to a transaction queue 204. Each proposed transaction may include one or more modifications to the world state represented by the blockchain, such as changing one or more field values or key-value pairs within a data set, including for example addition, modification, or deletion of such values. In some embodiments, proposed transactions may include conditional modifications, such that a modification to a value is conditional on, for example, other values within the ledger. In some embodiments, transactions may include references to smart contracts, corresponding to code executable to implement a transaction. For example, a transaction may include a reference to a particular set of code, such as code stored as on-chain data, stored as chain-adjacent data, or stored as a verifiably immutable set of code held at a cloud provider network 120, along with parameters for invoking that code. In further embodiments, transactions may include references to off-chain or chain adjacent data, such as a location of data within an object store 111 desired to be shared among participants to the blockchain. Each transaction may further include transaction metadata, such as a party proposing the transaction and information enabling the transaction to be authenticated, such as a digital signature of the party proposing the transaction (e.g., generated from a private key of the party proposing the transaction, and verifiable via a corresponding public key).

At (2), the consensus verify function 206 of the consensus node 202 reads the proposed transactions from the queue 204. As noted above, the consensus verify function 206 may represent execution of verifiable code, such as verifiably immutable code held by a cloud provider network 120 and executed by a service of the network 120, such as a serverless compute service. In one embodiment, the code implementing the consensus verify function 206 is verifiable from on-chain data. For example, one or more identifiers of the code (or other authentication information of the code) may be incorporated into the block chain, such as in a first block of the chain. Thus, participant nodes 210 may verify the code implementing the function 206 by reference to the identifier within the chain. Illustratively, a cloud provider network 120 may enable a client computing device 102 to retrieve an identifier of the function 206, such as a hash value computed via processing the code through a hashing algorithm, and a client computing device 102 may compare the retrieved identifier to the identifier on the chain. In another example, individual executions of the code may include the identifier in an execution result of the code, such that an individual can later audit the execution by comparing the identifier to that indicated on the chain.

In one embodiment, the consensus verify function 206 is invoked in response to the presence of proposed transactions in the queue 204. For example, a serverless compute service may provide functionality to periodically poll a transaction queue 204 for transactions, and to invoke the consensus verify function 206 on the presence of such transactions. In one embodiment, the consensus verify function 206 reads proposed transactions in batches, with a size corresponding to, for example, a number of transactions included within each block of the block chain, a number of transactions that can be acquired while maintaining set requirements (e.g., for commutativity and associativity), etc.

At (3), the consensus verify function 206 identifies the proposed transactions for voting to each participant node 210, and specifically to a participant verify function 218 of each node. Illustratively, addressing information for each participant verify function 218 may be included as metadata in the blockchain, which the consensus verify function 206 may refer to identify the participant verify function 218. In one embodiment, the consensus verify function 206 transmits the proposed transactions to each node 210. In another embodiment, the consensus verify function 206 transmits identifiers of each proposed transaction, without transmitting the proposed transaction itself. For example, nodes 210 may be configured to exchange transactions in a peer-to-peer manner, thus avoiding a need for the consensus verify function 206 to transmit transactions to each node 210. Similarly to the consensus verify function 206, the participant verify function 218 may in some instances be implemented as a serverless function, and thus the consensus verify function 206 may serve to invoke the participant verify function 218 when transmitting proposed transactions.

In some embodiments, the consensus verify function 206 may naively transmit proposed transactions to participant nodes 210. In other embodiments, the consensus verify function 206 may implement some processing of transactions. This proposing may include any number of verifications to ensure that individual transactions are valid, and to ensure that the combination of transactions submitted for inclusion within a given block is valid. For example, such processing may include such as verifying transactions are well formed, verifying that transactions do not leave the distributed ledger in a disallowed state (e.g., with a negative value for a field that disallows negative values), verifying that the combination of transactions is cycle-free (e.g., that a digraph formed by nodes corresponding to participants with transactions in the combination and edges corresponding flows of balances is cycle free), and that the transactions are either order-agnostic or correctly ordered (e.g., that when two transactions of the same participant require a specific ordering, that this ordering is maintained, or that when two unrelated transactions are combined within a group, that an end state of the ledger does not depend on an ordering of the two unrelated transactions, which may be referred to as a requirement for "commutativity" and "associativity" among transactions of a block). Verifying that specific transactions are order-agnostic may enable, for example, parallel computation when generating blocks of the blockchain, such as by dividing computation for two order-agnostic transactions (or groups of transactions) among two distinct computing devices, further speeding computation. In the instance that an individual transaction is not valid, the consensus verify function 206 may decline the transaction, such as by returning the transaction to a proposing participant node 210 or placing the transaction in a queue of declined transactions accessible to participant nodes 210. In the instance that a combination of transactions is not valid, the consensus verify function 206 may similarly decline the transaction, or alternatively may divide a problematic combination of transactions between different proposal groups, corresponding to different blocks in the chain. For example, the consensus verify function 206 may "hold" a particular transaction until a next round of proposals to ensure that requirements of a combination of transactions (e.g., commutativity and associativity) are adhered to.

Once proposals are sent to participant verify functions 218, each function 218 can evaluated the proposed transactions to determine a vote. To do so, each function 218 may, at (4), obtain blockchain metadata that describes, for example, policies agreed on by all blockchain participants. For example, the metadata may include schema information defining valid states for the distributed ledger, permissions information defining what actions specific participants are allowed to take, etc. While FIG. 3 depicts chain metadata being retrieved from chain data 216, metadata may additionally or alternatively be retrieved from ledger state data 212. Each function 218 may then evaluate the transactions according to the policies, to determine whether the transaction is valid. In some embodiments, each function 218 may further evaluate individual transactions and the group of transactions according to the verifications noted above, such as by validating the transactions are well formed, result in a valid ledger state, are cycle free, and are either order-agnostic or correctly ordered. Still further, in some embodiments, participants may apply customized and potentially participant-specific policies for determining transactions votes. For example, in the context of a supply chain, changes denoting a transfer of goods may be accepted only when the transaction is digitally signed by both parties to the transfer. A participant verify function 218 may therefore review such transactions to validate digital signatures prior to voting for the transaction. In the event that transactions meet the relevant requirements, the participant verify function 218 can generate a yes vote. In the event that transactions do not meet the relevant requirements, the function 218 can generate a no vote. In one embodiment, a vote may be for a group of transactions, as a slate. In such an embodiment, a function 218 may optionally indicate specific transactions within the slate that are rejected, resulting in a no vote. In another embodiment, each transaction may be voted on individually. Accordingly, each participant is afforded a vote as to any changes to the blockchain. During evaluation, proposed transactions may be persisted to durable storage of a participant node 210 to facilitate later commitment, forming a first phase of a 2-phase commit protocol.

At (6), the votes from each participant verify function 218 are returned to the consensus verify function 206, which counts the votes at (7). If the votes are sufficient to pass the transaction (or group of transactions), then these transactions are written to the blockchain. If the votes are insufficient, the transactions can be rejected, which may result for example in the transaction being returned to a proposing participant node 210, or (e.g., in the case of a slate of transactions) the group of transactions being reformed and re-voted on. In some instances, a participant node 210 may fail to return a response at (6), in which instance commitment or rejection of a transaction may vary according to requirements for the transaction, as recorded for example in blockchain metadata. For example, requirements for a transaction may require a certain percentage of all nodes 210 to approve a transaction, a certain percentage of responding nodes 210 to verify a transaction, or a combination thereof.

While FIG. 3 depicts a vote by all participant nodes 210, in some embodiments a blockchain may allow for votes by less than all participant nodes, such as by a quorum of nodes 210, with requirements for such quorum being set, e.g., within blockchain metadata. Accordingly, interactions (3)-(6) may occur with respect to a subset of participant nodes 210 represent a quorum, with the subset being selected according to any variety of load balancing algorithms (e.g., randomly, round robin, etc.). Use of quorum voting may, for example, reduce computing resource usage of individual participant nodes 210 and provide for fault tolerance, such that votes may proceed even when less than all participant nodes 210 are available.

Assuming that the vote succeeds, the interactions continue at (8), where the consensus verify function 206 submits the transactions to be applied to the consensus apply function 208. As noted above, the consensus apply function 208 may, similarly to the consensus verify function 206, be implemented as a serverless function on a serverless compute system, and may represent verifiable trusted code (e.g., as recorded on the blockchain). In the context of FIG. 3, the consensus apply function 208 may operate to distribute approved transactions to each participant node 210 for writing to the blockchain. In some embodiments, and as described in more detail below, the consensus apply function 208 may undertake additional actions, such as invocation of verified compute functions to, e.g., implement smart contracts.

Accordingly, at (9), the consensus apply function 208 submits to each participant apply function 220 the set of transactions approved via the participant verify functions 218. The participant apply functions 220, in turn, write these transactions to the blockchain as a block at (10). In some embodiments, the consensus apply function 208 transmits an approval of the transactions, without transmitting the transactions themselves. For example, where the participant apply functions 220 store proposed transactions in durable storage, the consensus apply function 220 may transmit to the participant apply functions 220 an indication that the proposed transactions have been approved, causing the participant apply functions 220 to write the approved transactions as a new block. Storage of transactions in durable storage of participant nodes 210 may occur, for example, due to transmission of transactions via the consensus verify function 206, due to peer-to-peer exchange transactions between participant nodes 210, due to submission of the transaction by the participant node 210, etc. As noted above, each block may be cryptographically linked to prior blocks within the blockchain, such as by include a cryptographic hash of the prior block within a current block. Accordingly, the chain data 216 may be used as an immutable ledger of transactions, enabling later verification of correctness for the distributed ledger. While shown in FIG. 3 as writes to chain data 216, each participant apply function 220 may additionally update ledger state data 212 to reflect a new "present" or "current" view of world state. Thus, the blockchain—as reflected in chain data 216 of each participant—is updated to reflect approved transactions. Moreover, updating of the blockchain does not require excessive computation as in past approaches.

As discussed above, participant nodes 210 may, in addition to storing chain data 216, store chain adjacent data 214. Accordingly, where transactions are applied that modify chain adjacent data 214, the participant apply function 220 can be configured to modify chain adjacent data 214 in accordance with the transaction. Illustratively, the participant apply function 220 may contain or represent code that converts data mutations contained within transactions into corresponding mutations applied to a chain adjacent data store 214. In this manner, participant nodes 210 are enabled to store a wide variety of data types as chain adjacent data 214, which may be distinct from the data format and type reflected in a distributed ledger. Accordingly, the participant apply function 220 may act as a "conversion" function, facilitating interaction between blockchain transactions and chain adjacent data 214. Moreover, as discussed below, embodiments of the present disclosure can provide for blockchain transactions to both record and effect changes to the blockchain or blockchain system 200. That is, in addition to simply memorializing such changes, transactions written to a blockchain may cause such changes to occur. Accordingly, the consensus apply function 208 and/or the participant apply function 220 can include code to effect transactions, such as by initializing a new participant node 210, transferring chain adjacent data between nodes 210, or the like. Example interactions for effecting modifications to the blockchain system 200 using blockchain transactions are discussed in more detail below.

In some embodiments, when writing transactions, each transaction modifying a particular field (which may also be referred to as a key) may be linked together, to facilitate later querying based on that field. For example, creation of a field via a transaction may be indicated within the transaction as a genesis transaction for the field. The ledger state data 212 for that field may maintain a "last modified" attribute, initially reflecting the genesis transaction and being updated for each transaction modifying the field. Moreover, each later transaction modifying the field may include the current "last modified" attribute prior to the transaction, thus creating a chain of pointers to each prior transaction modifying the field (or key) back to the genesis transaction. In some embodiments, this chain may be used to facilitate "time travel"-type queries, whereby a query may query what the value of a field is at a particular block (e.g., as a "height,"

where blocks number numerically increases as each block is added to the chain) or at a particular time indicating when such a block was created in the ledger. For example, where a user queries a field's value as of block n, a query processor (e.g., a frontend 222) may identify a "last modified" value for the field, inspect the transaction that last modified the value to identify a still prior transaction that modified the field, etc., until a pointer is located to a block number less than or equal to n, thus identifying the value of the field as of that block number. This mechanism of chained mutation history may facilitate rapid querying of the blockchain. Additionally or alternatively, indexes may be provided for various materialized views, corresponding to different block heights. For example, an index may be provided that indexes values of fields at each nth block, which may be utilized to query a field value at a given block height (e.g., by locating a highest-block-height index below the given block height and replaying transactions between the block height of the index and the given block height to result in the field value at the given block height). As yet another example, an index may be created for each data object an updated based on satisfaction of various criteria, which may vary per object. For example, an object's index may be updated after creation of a certain number of blocks, passage of a defined period of time, mutations of the object that satisfy various mutation criteria (e.g., a size of data changed, a number of fields changed, etc.), or the like.

While FIG. 3 is described with reference to creation of a block including transactions, in some instances blocks may include other data. For example, blocks may include operational metrics or data regarding the blockchain system, such as uptime of the system or nodes within the system, a number of transactions occurring per unit time (e.g., per minute, hour, day, etc.), transactions occurring per entity (e.g., per node 210, per entity controlling such nodes 210, etc.), outcomes of such transactions individually or in aggregate (e.g., a log or count of successful transactions; a log or count of failed transactions; a log of errors or error types for failed transactions; etc., each of which may be, for example, on a per entity basis, a per transaction-type basis), a record of attempted reads of data from the blockchain or chain-adjacent data and associated data (e.g., a record of successful reads indicating who has read data, a record of unsuccessful reads indicating who attempted to read data, etc.), or latency or other timing information for various operations (e.g., communications inter-node, with verified compute function 250, or with client computing devices 102; duration of individual executions of verified compute functions 250, consensus or participant verify functions, consensus or participant apply functions; etc.). Illustratively, such data may be calculated by a consensus node 202, participant nodes 210, or both and included each block. Where data is calculated at a participant node 210, the data may be shared among nodes 210 such that data within each block is the same, or the data may be excluded from calculation of the cryptographic hash for a block for purposes of cryptographic linking to subsequent blocks. By inclusion of operation data within blocks, tracking of performance of the blockchain system may be simplified, as each node 210 may read performance of the system at a given point in time by reference to a corresponding block.

The interactions of FIG. 3 may illustratively be repeated for each block added to the chain. In one embodiment, these interactions occur serially, such that a full set of interactions completes prior to a next set. In another embodiment, multiple instances of these interactions occur at least partly concurrently. For example, an instance of the consensus verify function 206 may operate with respect to a later block (e.g., via interactions 1-8) while an instance of the consensus apply function 207 occurs with respect to an earlier block (e.g., via interactions 9-10). In still another embodiment, multiple instances of the consensus verify function 206, multiple instances of the consensus apply function 208, or both, occur concurrently. For example, a second instance of the consensus verify function 206 may verify that a set of transactions for a later block can be applied independently to transactions for an earlier block (e.g., due to satisfaction of commutativity and associativity tests between the two sets) handled by a first instance of the consensus verify function 206, thus enabling parallelization within the consensus node 210. Because the number of parallel implementations of these functions is effectively unbounded (given appropriate transactions in the queue 204), commitment of blocks to the chain can occur very rapidly relative to alternative blockchain implementations. In this way, the total volume of transactions that may be handled by a participant node 210 can scale to very large levels. This parallelism is in stark contrast to prior blockchain techniques, in which individual nodes are associated with individual physical computing hosts, and thus limited to processing capabilities of such individual hosts, and in which creation of blocks is often restricted to a fully serialized algorithm, such that computation related to each block must complete before computation for a subsequent block can begin.

Figure 4:
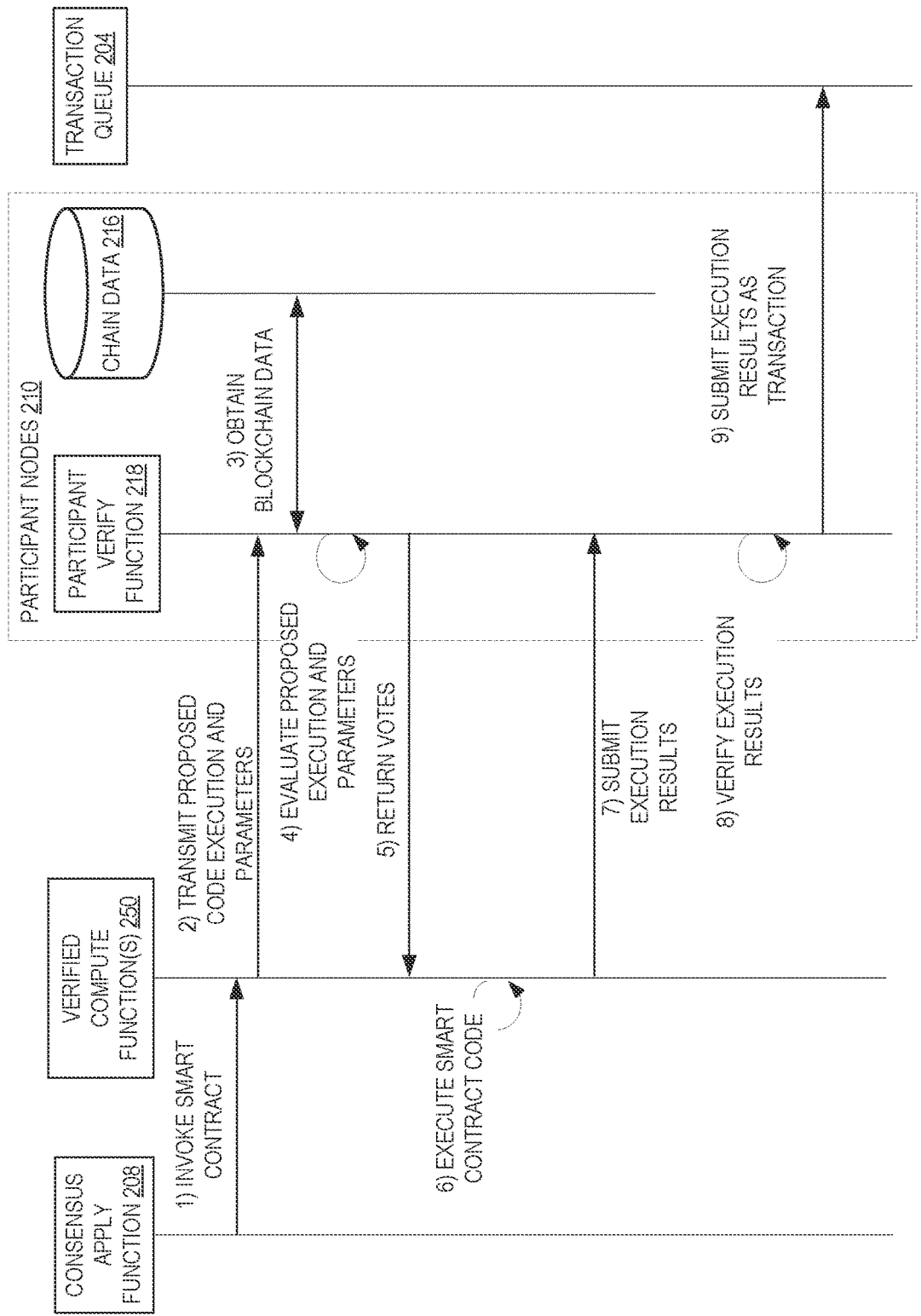
FIG. 4 depicts example interactions for utilizing a verified compute function on a trusted cloud provided to implement smart contract code, which may be specified by a participant, in accordance with embodiments of the present disclosure.

As noted above, two areas where past blockchain implementations typically prove inefficient is in reaching consensus as to which transactions should be accepted and in implementing smart contracts within transactions. The interactions of FIG. 3 address the former case, enabling consensus in an efficient and secure manner. As noted above, the second case may be addressed by implementing smart contracts via verified compute functions 250 on a cloud provider trusted by all participants to a blockchain. FIG. 4 depicts example interactions for utilizing a verified compute function 250 on a trusted cloud provided to implement smart contract code, which may be specified by a participant. Illustratively, a participant may propose a transaction with code specified within the transaction, with a pointer to a network location storing such code (e.g., in an object store 111), with a pointer to a location on the blockchain at which the code is stored, with an identifier to pre-existing code as stored on a cloud provider network 120 (e.g., an identifier of a serverless function), etc. The transaction may be processed via a normal consensus algorithm (e.g., via the interactions of FIG. 3, above). However, during application of the transaction, the consensus apply function 208 may invoke a verified compute function 250 to process the smart contract code. Illustratively, the invocation may occur asynchronously, such that the interactions of FIG. 4 do not delay finalization of a transaction invoking the smart contract. As noted above, because only a single instance of the verified compute function 250 need be invoked to process smart contract code, smart contracts can be implemented significantly more efficiently than other smart contract implementations, such as those requiring each verifier on a blockchain to execute the code.

The interactions of FIG. 4 begin at (1), where the consensus apply function 208 invokes the smart contract via call to a verified compute function 250. The verified compute function 250 may represent, for example, a serverless function with code stored in a verifiably immutable manner on a cloud provider network 250. The verified compute function 250 may illustratively be memorialized within the blockchain, such as via blockchain metadata including an identifier of the verified compute function 250. Invocation of the smart contract may include passing to the verified compute function 250 code of the smart contract or information identifying such code (e.g., a location of the code on a network-accessible data store), along with parameters of the smart contract, such as current field values based on a blockchain state.

Thereafter, the verified compute function 250 can validate the smart contract and parameters via interaction with participant nodes 210, to ensure that only previously approved smart contracts are executed, and that the parameters for execution of the smart contract are valid (e.g., reflect accepted current blockchain field values). Accordingly, at (2), the verified compute function 250 transmits the proposed code execution and parameters to participant verify functions 218 of participant nodes 210. Each participant verify function can then validate the smart contract and parameters, by obtaining blockchain data at (3) and, at (4), evaluating the proposed execution and parameters against the data, such as by verifying execution of the smart contract has previously been approved and verifying the parameters to be passed to the smart contract. Each participant can then return a vote as to whether to execute the smart contract, at (5). While validation of both the contract and parameters is discussed herein, in some embodiments interactions (2)-(4) occur solely with respect to parameters. For example, code validation may occur at a later point, when results of the execution are submitted as a transaction to the blockchain, thus removing a need to conduct such validation at interactions (2)-(4).

Thereafter, the verified compute function 250 may evaluate votes, and at (6) execute code of the smart contract if a sufficient number of "yes" votes are gathered. If insufficient positive votes are gathered, the smart contract may fail, and the verified compute function may return an indication of such failure to the consensus apply function 208. Execution of the code of the smart contract may include execution any of a wide variety of user-specified code, which may process the input parameters to the smart contract to generate a result corresponding to a transaction on the blockchain. Moreover, because code of the smart contract need only execute once, such code is not necessarily limited in the manner of other smart contracts that require independently-verifiable execution. For example, smart contracts as discussed herein may not be limited to specific specialized programming languages or limited to certain classes of actions (e.g., only idempotent actions), but may invoke any of a variety of actions, including non-idempotent actions. Accordingly, embodiments of the present disclosure greatly expand the type of smart contracts possible within blockchains without lessening the trust model for such contracts.

Accordingly, at (7), the verified compute function 250 submits execution results to each participant verify function 218. The results may illustratively be signed by the verified compute function 250, authenticating the results as being generated by the verified compute function 250, which in turn is identified in the blockchain as a verified immutable function. Accordingly, participants to the blockchain are enabled to trust results of the verified compute function 250 without requiring each participant to individually execute code of the smart contract.

At (8), each participant verify function 218 verifies results of the verified compute function 250, such as by verifying that the results are properly signed by the function 218, conform to an expected format for a transaction, etc. After verification, each participant verify function 218 can propose execution result as a transaction to the blockchain, by submitting the result to the transaction queue 204. Accordingly, results of the smart contracts execution are recorded in the blockchain, implementing the smart contract in a trusted and efficient manner.

While FIG. 4 depicts on example set of interactions for implementing smart contract code, others are possible. For example, in some embodiments the interactions of FIG. 4 are simplified by omitting interactions (2)-(5). Illustratively, rather than verifying a proposed execution and its parameters as part of invoking a smart contract, such verification may occur as part of verifying a transaction to invoke the smart contract (e.g., as part of interactions (3)-(8) of FIG. 3). As another example, the interactions of FIG. 4 may be modified to alter an entity submitting execution results as a transaction. Illustratively, rather than submitting execution results to participant nodes 210 for verification and submission as a transaction, in some embodiments a verified compute function 250 may directly submit an execution result as a transaction to the transaction queue 204, which result may then for example be verified as a transaction (e.g., according to the interactions of FIG. 3). Various additional modifications are possible. As yet another example, functionality ascribed to the verified compute function 250, above, may be implemented by another entity, such as the consensus apply function 208. For example, interaction (1) may be omitted, and the consensus apply function 208 may conduct interactions (2), (5), and (7) (either by submitting results to participant nodes 210 or directly to the queue 204, as noted above). The consensus apply function 208 may invoke the verified compute function 250 subsequent to obtaining votes at interaction (5), and obtain execution results from the function 250 thereafter (e.g., subsequent to interaction (6). Thereafter, interactions may proceed as described above. Thus, various modifications to FIG. 4 are possible.

As discussed above, adopting cloud resources as primitives for blockchains can provide a variety of benefits. Some such benefits flow from the ability of a cloud provider to provide for verifiable immutability of data resources, such as code. This in turn enables participants to trust that specific functions (e.g., the consensus verify function 206 and consensus apply function 208) are implemented correctly, without participants independently implementing such functions. Moreover, adopting cloud resources as primitives can enable trusted functions to execute with access to resources that may not be mutually available among participant nodes 210. For example, a consensus verify function 206 or consensus apply function 208 may, on a cloud provider network 120, be "owned" by an individual participant and thus granted access to resources of the participant on the network 120. The consensus verify function 206 or consensus apply function 208 may then access and use such resources during execution, without requiring that other participants be granted access to such resources. Nevertheless, because other participants may audit code of the consensus verify function 206 or consensus apply function 208 and verify that such code implements only trusted functionality, this asymmetric resource access does not break trust among participants. Such asymmetric resource access is generally not possible in other blockchain implementations.

To provide additional flexibility to a blockchain, it may be desirable for participants to agree to changes to trusted functions, such as the consensus verify function 206 and consensus apply function 208, and to have such changes implemented in a trusted manner. For example, participants may identify a flaw or lack of functionality in a given function and wish to replace it with a new function. In accordance with embodiments of the present disclosure, such changes can be facilitated by inclusion of blockchain metadata within the distributed ledger of the blockchain, which metadata reflects parameters such as the functions used by a consensus node 202, the identities of participant nodes 210, and the like. This metadata may then be modified in the same manner that other data of the blockchain is modified—by submitting a transaction that is approved by the blockchain participants and modifies the "world state" accordingly. For example, the consensus verify function 206 may be configured to identify the consensus apply function 208 by reference to an identifier of the function 208 within the distributed ledger. Thus, a transaction that modifies the distributed ledger to identify a revised, updated, or otherwise different consensus apply function 208 (e.g., as a globally unique identifier of a different serverless function) may cause the consensus verify function 206 to identify and utilize the revised, updated, or otherwise different consensus apply function 208, thus effectively replacing the function implemented by the blockchain. Participant nodes 210, in turn, may trust that the correct consensus apply function 208 has been invoked by comparing authentication information of the function 208 (e.g., a digital signature of a cloud provider coupled with a function identifier) to information within a current world state of the blockchain. Similar interactions can be used to modify effectively any component of a blockchain system, including the transaction queue 204, the consensus verify function 206, participant nodes 210. For example, the participant nodes 210 may be modified by altering a list of accounts within a distributed ledger, and potentially a number of participant nodes 210 permitted for that account (or identifying information for such participant nodes 210).

In addition to components of a blockchain system, metadata changes may be used to alter the information included within a blockchain world state, or permissions associated with such information. As discussed above, information within a world state may correspond to a schema agreed to by blockchain participants, identifying, e.g., specific data types and formats stored within the blockchain. In one embodiment, this schema is encoded within the distributed ledger, and thus may be modified via transactions. For example, a transaction may add a new supported data type or format to the schema, alter an existing data type or format, or the like. In one embodiment, transactions are required to maintain backwards compatibility with prior schema versions. For example, where a prior schema version identifies a particular field as "optional" for a complex data type, the blockchain system may disallow alterations that set the particular field as "required" for that complex data type, as such a change may result in existing items of that data type becoming invalid. Alternatively, the blockchain system may disallow alterations that set the particular field as "required" for that complex data type without altering all existing data item to include a value of the particular field. Thus, a blockchain's schema may be modified during operation of the blockchain, providing flexibility in the data stored therein and potentially ensuring backwards compatibility and continued validity of data stored within the chain.

As discussed above, encoding of blockchain metadata into the distributed ledger itself can provide for security and trust benefits not possible under other implementations. For example, use of verifiably immutable serverless functions to implement consensus verify and consensus apply functions 206 and 208, respectively, can enable aspects such as coordination and smart contracts to be carried out once, rather than being replicated among participant nodes 210. Identification of those functions within the blockchain can enable participant nodes 210 (or any auditor) to verify that the functions being executed are those trusted by chain participants. Identification of participant nodes 210 within the blockchain enables the consensus node 202 functions, in turn, to trust the nodes 210 used to receive and review transactions, host chain adjacent data, and the like.

In some embodiments, changes to blockchain metadata can further be used to control operation of the cloud provider network 120. That is, rather than simply reflecting changes to a state of the blockchain system 200, changes to metadata (or blockchain data itself) can effect changes to the blockchain system 200. Illustratively, a transaction adding a new participant node 210 to the system 200 may in some embodiments cause the consensus node 202 or existing participant node 210 to "spin up" the new participant node 210, by interacting with a cloud provider network 120 to provision the resources of the new node 210. Further, addition of a new participant node 210 can cause on-chain and chain adjacent data to be migrated to the new node 210. This, in turn, can be used to provide for ready replication of on-chain and chain-adjacent data. For example, entities today may manually replicate information between different cloud providers, or between different availability zones, regions, or sectors of a cloud provider in order to provide for "disaster recovery"—continued availability of data in the event of a disaster. Embodiments of the present disclosure can provide for programmatic disaster recovery preparation by adding a new participant node 210 at a desired location. Addition of the node 210 can cause appropriate data from existing nodes 210 to be migrated to the new node 210, thus effecting duplication of that data for disaster recovery purposes. As another example, regulatory rules may require that an entity perform replication between different cloud providers, or between different availability zones, regions, or sectors of a cloud provider. Addition of a new node 210 may thus also be used to satisfy such compliance requirements.

Figure 5:
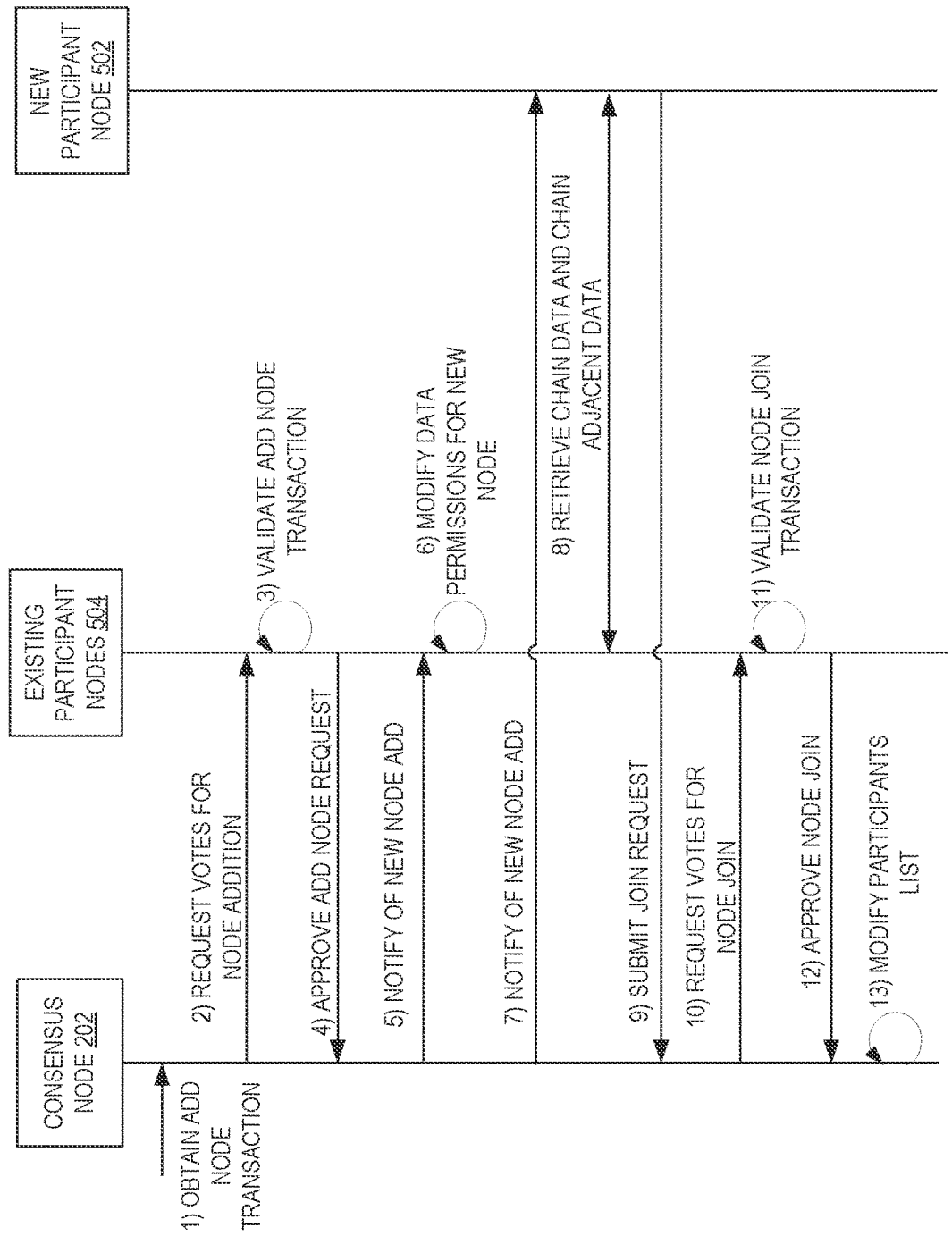
FIG. 5 depicts example interactions for adding a new participant node to the blockchain system, in accordance with embodiments of the present disclosure.

With reference to FIG. 5, illustrative interactions for adding a new participant node 210 to the blockchain system 200 will be described. As discussed above, these interactions may be used to add a new participant (e.g., a new entity) to the blockchain system 200. Additionally or alternatively, these interactions may be used to add a new node 210 associated with an existing entity to the system 200, such as for disaster recovery purposes.

In general, the interactions of FIG. 5 depict a two-stage addition process. Initially, existing participant nodes 210 evaluate and agree to add a new node 210 to the system 200. Thereafter, data of system 200 (e.g., chain data 216, chain adjacent data 214, and potentially ledger state data 212) is migrated from existing nodes 210 to the new node 210. When sufficient data is transferred from existing nodes 210 to the new node 210 to enable the new node 210 to evaluate subsequent transactions, the new node 210 is joined to the system 200 and acts as a participant node 210. This addition process provides a number of benefits. For example, the addition process does not inhibit operation of the blockchain system 200, which may continue to function while data is transferred to the new node 210. Further, by utilizing existing nodes 210 to populate data to a new node 210 in a peer-to-peer manner, data may be quickly populated, potentially in parallel, to the new node 210. Moreover, no manual migration of data is required—rather, the addition of a new node 210 programmatically facilitates replication of data, thus easing implementation of even complex data migrations.

The interactions begin at (1), where the consensus node reads (e.g., from the transaction queue 204) an "add node" transaction requesting to add a new participant node 502. Illustratively, one or more existing participant nodes 210 may be permitted, according to blockchain metadata, to invite additional participant nodes 210 to the system 200, and thus such a node 210 may submit a transaction to the queue to add a new node 502. The transaction may illustratively identify the new node 502 with reference, for example, to an account identifier on a cloud provider network 120, identifiers of functions or data stores of the node 502, etc.

At (2), the consensus node 202 transmits the transaction to the existing participant nodes 504 for voting. The existing nodes 504, at (3), validate the add node transaction, and return votes at (4). These interactions may be similar to interactions (3)-(6) of FIG. 3, and thus are not described in detail herein. However, in brief, each existing node 504 may evaluate the add node transaction to verify that addition of a new node 502 is permitted (e.g., that the new node 502 complies with any node requirements established within blockchain metadata, that the proposing node 210 has permission to invite the new node 502, etc.). As discussed above with respect to FIG. 3, while FIG. 5 depicts voting on a single transaction, existing nodes 504 in practice may vote on multiple transactions (e.g., a block of transactions). For ease of illustration, FIG. 4 assumes that the add node transaction is approved by the existing nodes 504.

At (5), in response to approval of the transaction by existing nodes 504, the consensus node 202 notifies the existing nodes 504 of the addition of the new node 502. This notification may be similar, for example, to interactions (8) and (9) of FIG. 3, representing a notification of transactions to be applied by participant nodes 210. The existing nodes 504, in turn, modify permissions on their respective data sources based on the addition of the new node 502, at (6). For example, the existing nodes 504 may add the new node 502 as a participant to the blockchain system 200, enabling the new node 502 to access data that is generally available to participants of the system 200. Illustratively, the existing nodes 504 may modify cloud permissions data for chain data 216, chain adjacent data 214, and potentially ledger state data 212, to enable access of those respective data stores by the new node 502.

In addition, at (7), the consensus node 20 notifies the new participant node 502 of its addition to the system 200. The notification may include, for example, identifying information of existing participant nodes 504. Such notification may enable the new participant node 502 to connect to the existing participant nodes 504 and, at (8), retrieve chain data 216 and chain adjacent data 214. In some embodiments, a new participant node 502 may also retrieve one or more materialized views of world state from the ledger state data 212 of an existing participant node 504. For example, where the new node 502 is associated with the same entity as an existing node 504, the new node 502 may sufficiently trust the existing node 504 to replicate a materialized view of world state. In other instances, the new node 502 recreates a materialized view of world state using chain data 216. In yet other instances, a new node 502 may recreate the materialized view of world state using a combination of ledger state data 212 and chain data 216 of an existing node. For example, ledger state data 212 of an existing node 504 may include a snapshot of a past world state (e.g., at a given block height), and the new node 502 may recreate the materialized view of world state using chain data 216 as applied to the snapshot. Rebuilding of word state using chain data 216 may implement similar strategies to those used to add transactions to a blockchain. For example, where two blocks are known not to conflict with one another, transactions of both blocks may be implemented in parallel to quickly rebuild world state.

As noted above, retrieval at (8) may occur in a peer-to-peer manner and via multiple parallel data transfers. For example, the new participant node 502 may be configured to load balance among multiple existing nodes 504 in order to rapidly retrieve all required chain data 216 and chain adjacent data 214. In some instances, nodes 502 may be grouped in a manner that at least partially controls transfer. For example, one or more nodes 502 may be owned by the same entity, and thus world state transfer between such nodes 502 may be permitted. As another example, world state transfer between nodes 502 not owned by the same entity may be disallowed. Transfers may additionally or alternatively be controlled based on other criteria, such as prioritizing transfer from nodes geographically nearby to the new node 504, from nodes with a similar configuration, etc.

At (9), after retrieval of required chain data 216 and chain adjacent data 214, the new participant node 502 submits to the consensus node 202 a join request. The join request may represent a transaction, similar to other transactions on the blockchain system 200, that requests that the new participant node 502 operate as a participant of the system (e.g., to evaluate and respond to proposed transactions). The join request may illustratively include information verifying that the new participant node 502 has sufficient chain data 216 and chain adjacent data 214 to operate as a voting participant node 210. The amount of chain data 216 and chain adjacent data 214 required for sufficiency may vary across embodiments. In one embodiment, sufficiency may be judge solely on chain data 216. In another embodiment, sufficiency may be judged based on a combination of chain data 216 and chain adjacent data 214, which may each have an independent threshold for sufficiency. In one example, sufficiency may require all or substantially all corresponding data (e.g., all chain data 216, all chain data 216 except for a last n rounds, etc.). In another example, sufficiency may require only a portion of corresponding data. For example, a given n consecutive blocks of a chain may be sufficient to respond to transactions involving those blocks, and may thus been deemed sufficient data to add the new participant node 502. Additionally or alternatively, sufficiency may require that the new participant 502 have a world state matching those of existing participant nodes 504. As this state may be transferred from one or more such nodes 504 rather than being recreated, sufficiency may be satisfied with relatively little data transfer. In one example, above-noted sufficiency requirements are combined. For example, where a majority of transactions relate to a most recent n blocks, a new participant node 502 may have sufficient data when it has replicated world state and retrieved the most recent n blocks. Additional data may then be retrieved subsequently, without inhibiting the new participant node 502 joining the blockchain system 200. In some embodiments, where a node 502 joins with less than full data (e.g., less than all chain data 216, less than all chain adjacent data 214, etc.), the node 502 may be added as a less-than-full participant. For example, such a node 502 may be required to designate an existing participant node 504 as a delegate, such that transactions that cannot be validated by the node 502 are redirected to the delegate node 504. On obtaining full data, the node 502 may then be converted into a full participant (e.g., via a new transaction), or alternatively remain as a less-than-full participant.

At (11) and (12), the existing participant nodes 504 validate and approve the join transaction. These interactions may be similar to interactions (3) and (4), above. For example, each existing node 504 may evaluate the join request according to various criteria to determine that the new participant node 502 is permitted to join the system 200 as a voting node 210, such as by re-validating the prior add node transaction, validating that the new node 502 has sufficient chain data 216 and chain adjacent data 214 to operate as a voting participant node 210, etc. In one embodiment, the criteria for sufficient chain data 216 or chain adjacent data 214 may vary between interactions (9) and (11). For example, interaction (9) may occur when a new participant node 502 has obtained substantially all, but not all, corresponding chain data 216, such as all chain data 216 except for a last n rounds, etc. During interaction (11), a participant node 504 may validate that the new participant node 502 has received additional chain data 216, such as the last n rounds not validated at interaction (9). This may enable a majority of data transfer to happen at interaction (8), without inhibiting creation of new blocks on the blockchain, while still ensuring that a final portion of data is transferred prior to adding the new node 502.

For the purposes of illustration of FIG. 5, it is assumed that the existing nodes 504 approve the node join, at (12). Accordingly, at (13), the consensus node 202 modifies its participant list to reflect the new node 502. Accordingly, the new node 502 can be included in the set of existing participant nodes 504 for purposes of later transactions. While not shown in FIG. 5, the consensus node 202 can further notify the existing nodes 504 that the join was approved, enabling the existing participant nodes 504 to modify their respective data regarding voting participants 504 (e.g., to validate that a transaction has sufficient votes to be approved, etc.). Accordingly, via the interactions of FIG. 5, a new node 210 can be added to the blockchain system 200, including replication of data of the system 200 to the new node 210.

While FIG. 5 is described with respect to a newly added participant node 210, similar interactions may be utilized to re-add a previously participating node 210. For example, the system 200 may be configured such that when a node 210 fails or "goes offline," the system 200 continues to function with a reduced number of nodes 210. Illustratively, on detection of a failed node 210, the consensus node 202 may initiate a transaction to at least temporarily remove the failed node 210 from the system, which on approval results in the consensus node 202 and other participant nodes 210 operating without respect to the failed node 210. On resuming operation, the previously failed node 210 may submit a transaction to the consensus node 202 to rejoin the system 200, resulting in the interactions of FIG. 5. Because the previously failed node 210 may already maintain at least some chain data 216 and chain adjacent data 214, retrieval of such data at interaction (8) may require only retrieval of newly added chain data 216 or chain adjacent data 214, or potentially retrieval of lost chain data 216 or chain adjacent data 214. Moreover, the interactions of FIG. 5 may in some instances be modified to support removal of a node 210 from a blockchain system. Illustratively, removal of a node 210 may occur similarly to addition of a node 210, with modification or removal of interactions (7) and (8). For example, interaction (7) may be modified to notify a node 210 of removal, and interaction (8) may be modified to include deletion of blockchain data on the removed node 210 or transfer of blockchain data from the node 210 to other remaining participant nodes 210. In one embodiment, a node 210 proposed for removal is excluded from the set of existing participant nodes 504 for purposes of the interactions described with respect to those nodes 504 above.

In addition to permissions controlling modifications to components of the blockchain system 200, embodiments of the present disclosure can further provide for permissioned access to data within or controlled by a blockchain (e.g., chain adjacent data). Illustratively, it may be desirable to store information in or adjacent to a blockchain but restrict access to such information to less than all participant nodes 210. In one embodiment, blockchain metadata may therefore include permissions information for one or more data objects in or managed by the blockchain. To restrict access to various participant nodes 210, the permissioned data may be replicated between participant nodes 210A according to permissions for the data. Illustratively, participant nodes 210 with full permission to access data may obtain a full, unredacted version of the data. Participant nodes 210 with permission to access only a portion of the data may receive a redacted version of the data. Participant nodes 210 with no permission to access the data may not receive any information, or may receive only a nominal segment of information (e.g., a redaction marker or the like). Redactions may be utilized to restrict access to any portion of the data. Additionally or alternative, redactions may be used to restrict access to metadata regarding the data. For example, where a name of a data item is stored as metadata, the name may be transformed according to any of a variety of obfuscation or encryption techniques (e.g., by hashing according to a cryptographic hash function) and stored in encrypted form, such that only participant nodes 210 with access to that data or metadata can access unredacted data. Illustratively, decryption or deobfuscation information for the data may be stored within a transaction for the data on the blockchain, with such decryption or deobfuscation information itself being redacted, e.g. the manner discussed below, from nodes 210 not permitted to access decrypted or deobfuscated data.

Somewhat similarly, embodiments of the present disclosure can provide for permissioned transactions, such that less than all participant nodes 210 are aware of the details of a transaction. Illustratively, where a blockchain stores information that is restricted to two participant nodes 210, subsequent transactions modifying that information may be viewable only to the two participant nodes 210. Other participant nodes 210 may receive an indication of the transaction, without details of the transaction. Notably, because these other participant nodes 210 have not stored the information, this lack of transaction details does not result in inconsistent ledger state—having no access to the information, other participant nodes 210 have no need to implement data modifications reflected in a transaction. To facilitate verification of ledger contents, each participant node 210 may maintain multiple hash values for redacted transactions (e.g., where less than all parties can view information of a transaction). For example, each node 210 may maintain a "global hash" that reflects the full transaction, with the hash being calculated by participant nodes 210 having permissions to view the full transaction and submitted to other nodes 210 during transaction processing. The "global hash" may alternatively be referred to as an "original hash." Each node 210 may further maintain a "local hash" that reflects the transaction as viewed by the node 210. The "local hash" may alternatively be referred to as a "redacted hash." Use of two hashes can provide for transaction redaction without otherwise impairing operation of a blockchain. For example, any participant node 210 with full access to a transaction can compute the global hash, and thus vote to accept or reject the transaction based on verifying that hash.

Due to inclusion of local hashes, the ledger at each node 210 may be independently audited to confirm correct contents of the ledger. Due to the inclusion of a global hash, ledgers across two nodes 210 can be verified to be consistent, even if the data within those ledgers differs due to different permissions to access data. Additionally or alternatively to global and local hashes for individual transactions, global and local hashes may be calculated and stored within the blockchain for individual blocks (e.g., which blocks may include redacted transactions). Use of redacted transactions or blocks can provide solutions to key problems of transaction anonymity and privacy within other blockchain implementations.

The permissions noted above may be applied to implement various access restriction techniques, such as access control lists (ACLs), role-based access controls (RBACs) or the like. For example, to implement an ACL-type control, each data object stored in or adjacent to the blockchain may be associated in the blockchain with metadata identifying a set of accounts on one or more cloud provider networks 120 that may access data (e.g., each account being associated with a participant node 210). The metadata may identify accounts directly or utilize other specification techniques, such as wildcards. Similarly, to implement RBAC style controls, metadata may link particular nodes 210 to particular roles, and further establish for a given data object or set of data objects the particular actions that particular roles are permitted to take. Individual nodes 210 may be identified within permissions based, for example, on authentication of the node 210 with a cloud provider network 120. For example, a node 210 executing on a cloud provider network 120 on behalf of a specific user account may be authenticated, by the network 120, as associated with the user account. Permissions within the blockchain may then be linked to that user account, such that on execution the node 210 can be authenticated to other blockchain participants via operation of access controls of the cloud provider network 120. Permissions may additionally or alternatively be specified according to other authentication and authorization mechanisms, a variety of which are known in the art. For example, permissions may be specified according to Security Assertion Markup Language (SAML) credentials, Single Sign-On (SSO) credentials, customized user pool credentials, or the like.

The metadata can thereafter be used to control access to and dissemination of the data object. For example, with respect to data stored on chain, transactions relating to a permissioned data object may be appropriately redacted. With respect to chain-adjacent data, discussed in more detail below, the set of nodes 210 selected to host the chain-adjacent data may be selected from those permitted to access the data. Moreover, each such node 210 hosting chain-adjacent data can be configured to maintain appropriate permissions for the data, as hosted at that node 210. For example, a node 210 storing permissioned data in an object store 111 may be configured to establish permissions on that object store 111 matching the permissions for the data as reflected in the blockchain.

In some embodiments, a blockchain may be formatted to facilitate later erasure of data within the chain. Such erasure may be desirable from a privacy perspective. For example, various regulations or laws may enforce a "right to be forgotten"—a right of an individual to have their private data removed from a data set held by another (e.g., on a public network). Such removal might be viewed as at odds with the guarantees of blockchains, since one benefit of blockchains is often their immutability. A given transaction may "delete" data from a current world state; however, that data may still be stored in prior blocks in the blockchain, and thus recoverable. Thus, existing blockchain implementations may have difficulty in enabling data written to the blockchain to be later erased in an irrecoverable manner, which may be important for privacy purposes. Embodiments of the present disclosure address this problem by providing for block formats that facilitate later erasure.

In one embodiment, nodes (e.g., participant nodes 210) are configured to accept values (or entire data objects, which may contain multiple values) in a transaction designated by a client as private, confidential, sensitive, or otherwise erasable. Rather than writing the value or object directly to a block, the value or object may first be encrypted (according to any of a variety of known secure cryptographic algorithms, such as Advanced Encryption Standard (AES) algorithms among others) using a key, which may be generated by the node. Rather than storing the value or object as plaintext in a transaction, an encrypted representation of that plaintext may be stored in the transaction. The node may then store the key off-chain, such as in a distinct data store (e.g., a key management service, or KMS, provided by a cloud provider network 120 on which the node is implemented). Illustratively, the node may assign each data object a globally unique identifier (GUID), and may store the key in association with the GUID. Subsequent requests to read the value or object may then be serviced (if authorized, e.g., according to permissions data as noted above) by retrieving the key, reading the encrypted representation (e.g., from world state or chain data), decrypting the encrypted representation, and returning the plaintext in response to the read. In one example, the key is maintained at a single node 210, such as a node 210 associated with the client that submitted the erasable data. In another example, the key is propagated to multiple participant nodes 210 (e.g., multiple nodes 210 associated with the client, nodes 210 of different clients, etc.). For example, keys may be handled as chain adjacent data 214, in the manner described herein. In yet another example, each node 210 storing an erasable data object may independent compute and maintain a key, such that security compromises at a single node 210 Erasure of data, as opposed to merely deletion from a current world state, may then be facilitated by deletion of the key. For example, a client may submit a "erasure" transaction identifying the private value or object, which may cause the relevant node to delete the key. Assuming that the encryption used is not compromised, only an encrypted version of the data would be stored within chain data 216, rendering the plaintext irretrievable and thus erased. Moreover, because erasure does not require modification of already-minted blocks, this technique does not otherwise impact the guarantees provided by the blockchain.

In a variation on the above, nodes may additionally or alternatively utilize tokens in place of encrypted forms of erasable data. Each token may be a unique identifier associated with, but not independently representative of, the erasable data. The plaintext data may be stored independent of the blockchain (e.g., in a manner similar to encryption keys, above), while the corresponding token is stored in the blockchain (e.g., in transactions associated with erasable data). Reads of the data (e.g., at a participant node 210) may then be serviced by identifying the token and retrieving the plaintext data corresponding to the token from the data store in which the token is stored (e.g., chain adjacent data 214). The plaintext data can then be returned. Similarly, modifications of the data may be serviced by modification of the plaintext in the data store. Moreover, each node may support reads of the token, as opposed to the plaintext data, such as for purposes of audits. Illustratively, a token may be treated as "redacted" data for purposes of hashing, and thus included in local hashes, as described above, while the plaintext data may be treated as unredacted data and included within a global hash. In this example, erasure may be achieved by modifying the data store to remove the plaintext data (e.g., by submitting an erasure transaction that causes all participant nodes 210 storing the plaintext data, which may be a single node 210 or multiple nodes 210 as described above), to delete the plaintext data.

In another embodiment, a blockchain may be formatted to support erasable data in a blockchain by modifying how blocks in the chain are cryptographically linked to one another. Illustratively, erasable data may be stored in a block in two forms: a plaintext form and a hash (e.g., cryptographic) of that plaintext. Each subsequent block may be cryptographically linked to the prior block by use of the hash of erasable data, but not the plaintext (e.g., by including in the subsequent block a hash of all data of the prior block excluding the erasable plaintext). For example, on receiving a transaction with data (e.g., a value or object) marked as erasable, a node (e.g., a participant node 210) may generate a hash of the data for inclusion in a transaction. Thereafter, creation of new blocks (e.g., by the consensus node 202) may occur by cryptographic link to a prior block, without reference to the erasable data. Erasure of erasable data may then occur by removal of the plaintext from each block in which it is stored. For example, a node 210 may accept, as appropriate (e.g., due to permissions) a transaction to erase a given erasable object or value, and if the transaction is accepted, all nodes 210 storing the plaintext of the erasable object or value may be instructed (e.g., by the consensus node 202) to delete that plaintext. Because the plaintext is not used to cryptographically link blocks, this deletion of chain data 216 does not result in inconsistency of the chain.

One skilled in the art will appreciate that the above techniques for supporting erasure may be combined. For example, each block in a chain may store both a hash of plaintext (used to support cryptographic links to subsequent blocks) and an encrypted version of the plaintext or token associated with the plaintext (e.g., not used to support cryptographic links to subsequent blocks). Combination may facilitate, for example, independent audits of blockchain data veracity for those with knowledge of the plaintext.

As noted above, embodiments of the present disclosure can provide for permissioned transactions. Where erasure is supported, such permissions can be extended to account for potential erasure, such as by providing permissions for viewing erasable values or objects as plaintext, permissions to view an encrypted representation, key, or token corresponding to the values or objects, permissions to erase objects, and the like.

As discussed above, another challenge with other blockchain implementations is that of sharing large amounts of data. Encoding of such data "on the blockchain" within the distributed ledger can require excess computation and cause ballooning of the ledger itself. On the other hand, simply storing the data off chain removes protections provided by blockchain encoding. To address these problems, embodiments of the present disclosure can provide for storage of "chain adjacent" data, in a manner that provides most or all protections of direct on-chain storage, and may therefore be considered effectively "on-chain" to end users. Specifically, as described herein, embodiments of the present disclosure can provide for non-chain data to be replicated among participant nodes 210 in a manner that provides data resiliency, and for that non-chain data to be modified via blockchain transactions in a manner that provides for trusted data modification.

To provide for handling of chain-adjacent data, embodiments of the present disclosure can utilize "on-chain workflows," which represent activities that span multiple blockchain rounds (with the creation of each block representing a "round"). Each workflow may be stored within the distributed ledger as a 3-tuple of {round(s), action, arguments}, indicating that when the current round (e.g., a current block height) equals round, then action should be taken by the consensus node 202, passing arguments. Each workflow may be designated within the blockchain as a workflow, to distinguish the workflow from other data objects stored in the chain. The action itself may be specified by logic directly encoded into the workflow, or by reference to external logic such as a particular serverless function referenced in the workflow. As discussed below, such workflows can then be used to automate propagation of chain adjacent data. Specifically, an initial transaction may be created that indicates data within a network-accessible location and that instructs a threshold number of participant nodes 210 to access the data and store the data within their respective chain adjacent data stores 214. Each participant node 210 (e.g., via operation of a participant apply function 220) can be configured to initiate a copy operation of the data from the indicated location to their respective chain adjacent data stores 214, and submit a transaction to the blockchain when that copy operation is completed. The initial transaction may further initiate a workflow on the blockchain in the form of {current_round through TTL, verify, copy_operations}, which instructs the consensus node 202 to, on each round from the current round to a "time to live" (or TTL) value (which may be selected based on an expected duration of the copy operation) to verify that copy operations by the threshold number of participant nodes 210 have successfully completed. If such operations have not completed, the node 202 may reinitiate further copying of the data, or mark the storage of the data as chain-adjacent data as incomplete (e.g., via transaction on the blockchain). If such operations have completed, the node 202 may mark the actions complete (e.g., via transaction on the blockchain).

In some instances, storage of chain adjacent data in this manner can enable the data to be stored with the same trust and resilience as data directly encoded into a cloud-primitive-based blockchain. For example, a cloud provider network 120 may enable a user to designate stored data as verifiably immutable and deletion free, which the network 120 may be configured to guarantee. Storage of chain-adjacent data by a participant node 210 in this manner will therefore provide effectively the same trust and resiliency guarantees as data stored within a cloud-primitive-based blockchain. Alternatively, a cloud provider may enable a user to render stored data as verifiably immutable, but not as verifiably deletion free. In such cases, additional workflows may be utilized to periodically (e.g., each nth round) validate data and to ensure that data is held in a sufficient number of participant nodes 210 to provide desired resiliency. Data held in a verifiably immutable, but not verifiably deletion free, manner can provide similar trust as data held in verifiably immutable and deletion free storage, but may lack resiliency against deletion. Nevertheless, propagation to a quorum of participant nodes 210 can provide significant resiliency against deletion.

While the above examples are provided with respect to sharing of new chain-adjacent data, modifications of chain-adjacent data can be handled similarly. For example, verifiably immutable data (either with or without being verifiably deletion free) may be stored as a data version in a cloud provider network 120. Modification of the data may cause a new data version to be created, which can then be recorded within the blockchain as a transaction that reflects modifying metadata of the data object from a past version to a new version. Deletion may be similarly handled, by modifying metadata of the data object in the blockchain to a "tombstone" or the like indicating removal of the data.

In addition to the benefits noted above, another benefit of the above-noted chain-adjacent data transfer mechanism is that large amounts of data can be transferred via the blockchain without inhibiting operation of the blockchain with respect to other transactions. Specifically, data transfer operations may occur asynchronously, and thus not halt (or "block") new rounds of transactions on the blockchain, or prevent addition of new blocks to the chain. Rather, data transfer operations can occur in parallel to processing of new transactions and potentially in parallel to one another. This enables effectively unbounded volumes of data to be transferred via operation of the blockchain without impacting transaction processing of the blockchain system 200 and independent of the blockchains system 200 transaction processing speed. Moreover, functionalities such as version tracking and verifiably immutability at cloud providers 120, paired with recordation of corresponding transactions on the blockchain, enable chain-adjacent data to be stored with significant trust, potentially equivalent to trust of data stored directed in the blockchain.

Figure 6:
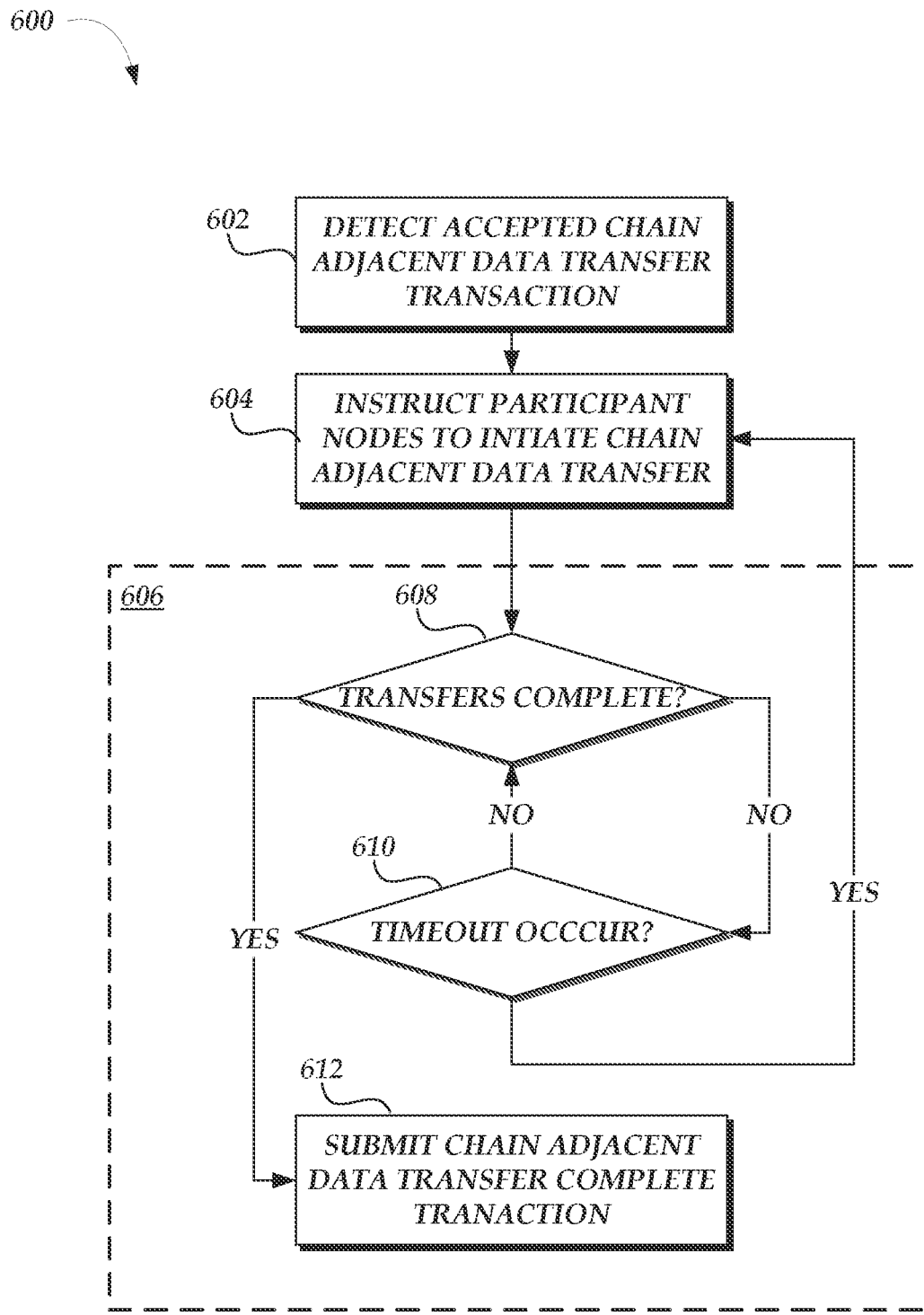
FIG. 6 depicts an illustrative routine for conducting transfer of chain adjacent data via a blockchain, in accordance with embodiments of the present disclosure.

With reference to FIG. 6, an illustrative routine 600 will be described for conducting transfer of chain adjacent data via a blockchain in accordance with embodiments of the present disclosure. The routine 600 is implemented, for example, by the consensus node 202 (e.g., via operation of one or both of the consensus verify function 206 and the consensus apply function 208).

The routine 600 begins at block 602, where the consensus node 202 detects an accepted chain adjacent data transfer transaction. Illustratively, block 602 may be implemented by the consensus apply function 208, e.g., between operations (7) and (8) of FIG. 3, in instances where the transaction of FIG. 3 is a chain adjacent data transfer transaction. In some embodiments, such a transaction may stem, for example, from submission of such a transaction to a frontend 222 of a participant node 210. In other embodiments, such a transaction may be programmatically generated by a participant node 210 based on an attempt to modify chain adjacent data 214. Illustratively, a node 210 may detect an attempt by a client to write to chain adjacent data 214 (e.g., by modifying the data 214 as stored in a distinct "staging area"), and in response programmatically generate a transaction including the attempted write. In one example, an accepted transaction may include a verification that the chain-adjacent data has been stored in a verifiably immutable manner by a participant node 210 (e.g., for at least a period of time). Storage in this manner can facilitate transfer, as the data can be guaranteed not to change during that period of time, which may be sufficient for implementation of the routine 600. The transaction may include information required to conduct a chain adjacent data transfer, including for example a network-accessible location from which to obtain data, access credentials for the data (or an identifier of one or more pre-defined access credentials to use to access the data), validation information for the data (e.g., a hash of the data, information confirming that the data is stored in a verifiably immutable way, etc.), permissions information for the data (e.g., which nodes 210 are to be permitted access to the data) and the like. In some embodiments, the transaction may further include parameters for maintaining chain adjacent data, such as a threshold number of participant nodes 210 that should store the data, when and how subsequent validation of the data should occur, etc. In other embodiments, these parameters may be pre-defined, such as in blockchain metadata.

At block 604, the consensus node 202 transmits instructions to each of a set of participant nodes 210 to initiate the chain adjacent data transfer. For example, the node 202 may instruct the set of participant nodes 210 to access the data at the location indicated within the transaction and copy the data into their respective chain adjacent data stores 214. The set of participant nodes 210 is illustratively selected to contain a "quorum" of nodes 210 sufficient to meet a threshold number required for the transaction. This set may be selected from those participant nodes 210 that are to be provided access to the data, for example, according to random selection or other load balancing criteria (e.g., round robin selection, least-data-stored selection, etc.). As discussed above, each participant node 210 may be configured to accept instructions from the consensus node 202 and initiate the chain adjacent data transfer. Further, each participant node 210 can be configured to acknowledge completion of the data transfer by submission of a corresponding transaction to the blockchain reflecting that completion (e.g., as a transaction that reflects an identity of the participant node 210 and the particular transfer that has completed). In some embodiments, these completion transactions may be verified by other participant nodes 210 by, e.g., verifying access to the data within the chain adjacent data store 214 of the participant node 210 submitting the completion transaction, or verifying a hash value of the data as stored at a data store of the participant node 210 (which hash value may illustratively be generated by operation of a cloud-provider storage service of a cloud provider network 120, and thus serve as a trusted indication of successful copying by the participant node 210). Further, each participant node 210 may store the data in a verifiably immutable manner, and provide information confirming such storage within the completion transaction, enabling other participants 210 to verify that the data has been successfully stored in a trusted manner. As noted above, in cases where portions of chain adjacent data are permissioned to be accessed by less than all participant nodes 210, multiple hashes may exist for the data, such as a global hash reflecting full contents of the data and a local hash reflecting contents of the data accessible to an individual node 210 (which may be less than full contents). In such embodiments, a participant node 210 may utilize an appropriate hash to verify transfer. For example, a participant node 210 that does not have full access to data may nevertheless verify that another participant node 210 has obtained full contents of the data by comparing a global hash, as provided for example by a first node 210 owning the data, to a global hash provided by the other participant node 210 (or a cloud provider network 120 utilized by the other participant node 210).

While the above examples discuss a quorum including multiple participant nodes 210, in some embodiments a single node 210 may be sufficient to form a quorum. For example, the node 210 may interact with a cloud provider network 120 to render the data as verifiably immutable and deletion free, which may be sufficient to guarantee access to other participant nodes 210 (e.g., due to redundancy and resiliency guarantees provided by the network 120).

Thereafter, the consensus node 202 implements an on-chain workflow 606 to monitor the chain adjacent data transfer. As noted above, the workflow 606 may be stored at the consensus node 202 in response to the accepted transaction and indicate actions and corresponding parameters to be action by the consensus node 202 on each subsequent round. In some cases, on-chain workflows may enable logic within the action, such as conditional statements, to facilitate workflow creation. Furthermore, the action specified may in some cases be carried out by a particular serverless function, thus enabling a workflow to implement any variety of logic supported by such functions.

Though a wide variety of functionality is possible using workflows, the additional blocks of FIG. 6 reflect the workflow 606 implemented in connection with the routine 600. The workflow 606 is illustratively implemented on each round of processing by the blockchain system, which may correspond to each creation of a new block. Specifically, at block 608, the consensus node 202 determines whether chain adjacent data transfers by the threshold number of participant nodes 210 have completed. In the case that such transfers have completed, the routine 600 processed to block 612, where a new transaction is submitted to the blockchain indicating that the chain adjacent data transfer is complete. This transaction may then be verified and accepted as noted above. This transaction can thus indicate, within the blockchain, that the chain adjacent data has been successfully copied to the threshold number of participant nodes 210. In some embodiments, the transaction may include information to validate successful copying, such as a hash value of the data at each participant node 210. Illustratively, such a hash value may be generated by operation of a cloud-provider storage service of a cloud provider network 120, and thus serve as a trusted indication of successful copying by each participant node 210.

The routine 600 then ends. While not shown in FIG. 6, the routine 600 may in some cases include additional functions, such as periodic verification of the data at the various nodes 210 and re-transferring of the data to additional nodes 210, as required, to maintain quorum. In some instances, the routine 600 may further be modified to provide for immutability or deletion protection at individual nodes 210. For example, the instruction transmitted at block 604 may cause each participant node 210 to store the chain adjacent data in an immutable and/or deletion free manner for at least a period of time (e.g., by placing the data in an "embargoed" state). Storage in this manner may be recorded to the blockchain (e.g., in the transaction verifying completion of a transfer or in another transaction), thus providing trust among participants that the chain adjacent data is stored for at least that period of time, without requiring trust among participants themselves.

In the instance that the transfers have not completed at block 608, the routine 600 proceeds to block 610, where the consensus node 202 determines whether a timeout has occurred (e.g., whether the final round indicated within the workflow has been reached). If not, the routine 600 returns to block 608 and continues as discussed above. Accordingly, the consensus node 202, at each round between initiation of the chain adjacent data transfer and the final round, can check whether the chain adjacent data transfer operation has completed. If the timeout has occurred at block 610, the routine 600 returns to block 604, where the consensus node 202 again instructs participant nodes 210 to copy data from the relevant location to their respective stores 214. Illustratively, for second and subsequent iterations of block 604, the set of participant nodes 210 may be reduced according to the number of successful transfers that have occurred. For example, if 2 of 10 required transfers have occurred, the set of nodes 210 instructed at block 604 may be set to 8. In some embodiments, the participant nodes 210 instructed may be varied at each implementation of block 604, to account for example for errors at individual nodes 210. Accordingly, such errors at individual nodes 210 need not invalidate the routine 600 as a whole. The routine 600 then returns to block 608 and continues as noted above. Thus, the routine 600 can continue until a quorum or threshold number of participant nodes 210 have stored the data, thus ensuring trust and resiliency (e.g., durability and availability) in storage of the chain adjacent data by the blockchain system.

While not shown in FIG. 6, the routine 600 may be modified to account for non-transient errors. For example, block 610 may be modified to record an error (e.g., as a transaction) to the blockchain if a timeout occurs a threshold number of times.

The routine 600, as described above, can provide for pro-active transfer of chain adjacent data between participant nodes 210. However, in some embodiments chain adjacent may be shared in other ways. For example, a first node 210 may "share" access to chain adjacent data, enabling other nodes 210 to access the data as stored by the first node 210, such as by submitting a transaction to the blockchain with access details for the chain adjacent data. As another example, data may be transferred between nodes 210 via a "copy on read" mechanism, such that a second node 210 stores, within its local chain adjacent data 214, chain adjacent data read from another node 210.

While FIG. 6 is described above with respect to data redundancy within a blockchain system 200, duplication of chain adjacent data may additionally or alternatively occur for other purposes. For example, some embodiments of the present disclosure may enable participant nodes 210 to "cache" chain adjacent data that they otherwise have access to but are not currently storing (e.g., due to non-selection within the routine 600). Illustratively, a participant node 210 that wishes to cache chain adjacent data may submit a caching transaction, which records (or causes) copying of the chain adjacent data from another participant node 210 (e.g., selected from the set storing the adjacent data) to the initial participant node 210. Providing for such "on-chain" cache records can enable knowledge within the blockchain system 200 as to where data has been stored. For example, in some embodiments cache locations may be used as an additional source of the data for purposes of transfers of that data. A caching node 210 may in some embodiments maintain cached chain adjacent data in the same manner as nodes 210 formally storing that data on behalf of the system 200, such as by monitoring blockchain transactions for modifications to the data (or metadata regarding the data, such as permissions) and modifying the cached data accordingly.

While described above with reference to conducting transfer of chain adjacent data via a blockchain, the on-chain workflows described above can be utilized to implement a wide variety of functionality. For example, on-chain workflows may be utilized similarly to, or as a replacement of, other workflow orchestration services such as "step functions" or "logic apps." For example, an end user may author a workflow in the form of one or more tuples, such as the triple of {round(s), action, arguments} noted above. Additionally or alternatively, an end user may author a workflow in another format, which may be converted (e.g., by a frontend 222 of a participant node 210) into one or more tuples. As noted above, each tuple can define one or more rounds on the blockchain (e.g., as a range of chain height)

during which participant nodes 210 should implement an action, passing arguments. The arguments may, for example, be static, variable according to data entries on the distributed ledger, or references to other data (e.g., via a URL or other link). The action may be specified as logic (e.g., code) that is encoded as part of the workflow, or as a reference to other logic, such as a serverless function. Illustratively, where a workflow is logically represented by a state diagram, each potential state within the diagram may be represented as a tuple. Arguments for each tuple may include a data entry on the distributed ledger (e.g., corresponding to a current value for the entry) that indicates a current state of the workflow. Logic for each action may thus evaluate the state, as passed via argument, and take further action if the current state matches the potential state corresponding to the tuple. Further action may include any variety of processing, including transitioning the current state to another potential state. Thus, both the state of the workflow (the current state of the state machine represented by the workflow) and any data that it manipulates can be in world state and reflected as transactions in blocks in the ledger. Accordingly, during each round of blockchain operation, one or more nodes, such as a consensus node 202, may implement the actions specified in each tuple whose rounds criteria includes a current round, thus enabling implementation of logic corresponding to the relevant tuples. In this way, any variety of workflows can be implemented.

As a simplified example, consider a workflow that processes a batch of data items via execution of a serverless function, such as converting each delimited entry of a file (e.g., in comma separated value (CSV) format or any variety of delimited format) into a set of updates on the blockchain as if they had been individually presented by a client one at a time. The workflow may include a first stage, during which one or more data items is selected from the batch and passed to a serverless function for processing. The workflow may further include a second stage, during which results of the function are validated, and the data item is either marked as processed, marked for resubmission, or marked as failed. This workflow may be encoded onto the blockchain as two tuples. Each tuple may include a range of rounds, indicating a maximum duration of the workflow in terms of newly minted blocks on a chain. The range may be identical between the two stages, or the second stage may for example have a longer range. With respect to the first stage, the action may correspond to logic (encoded into the tuple, specified in external logic such as another serverless function, etc.) to retrieve a data item from a batch identified in a corresponding argument and invoke the serverless function. With respect to the second stage, the action may correspond to logic to retrieve a result of the serverless function (e.g., from a location specified in an arguments of the tuple, which may be an entry on the distributed ledger, external data, etc.), validate the result, and modify the batch accordingly (e.g., by marking the item as processed, for reprocessing, failed, etc.). Thus, multiple tuples can operate in coordination to implement the workflow. While a simplified example is provided herein, one skilled in the art will appreciate that this functionality enables a variety of workflows to occur directly via operation of blockchain participants. Moreover, in contrast to other functionalities, on-chain workflows may be long running. For example, such workflows may span multiple blockchain rounds, with little or no limitation on maximum duration. Moreover, operation of such workflows—by virtue of their encoding on the blockchain—may be auditable and verifiable in a manner similar to other blockchain transactions.

Figure 7:
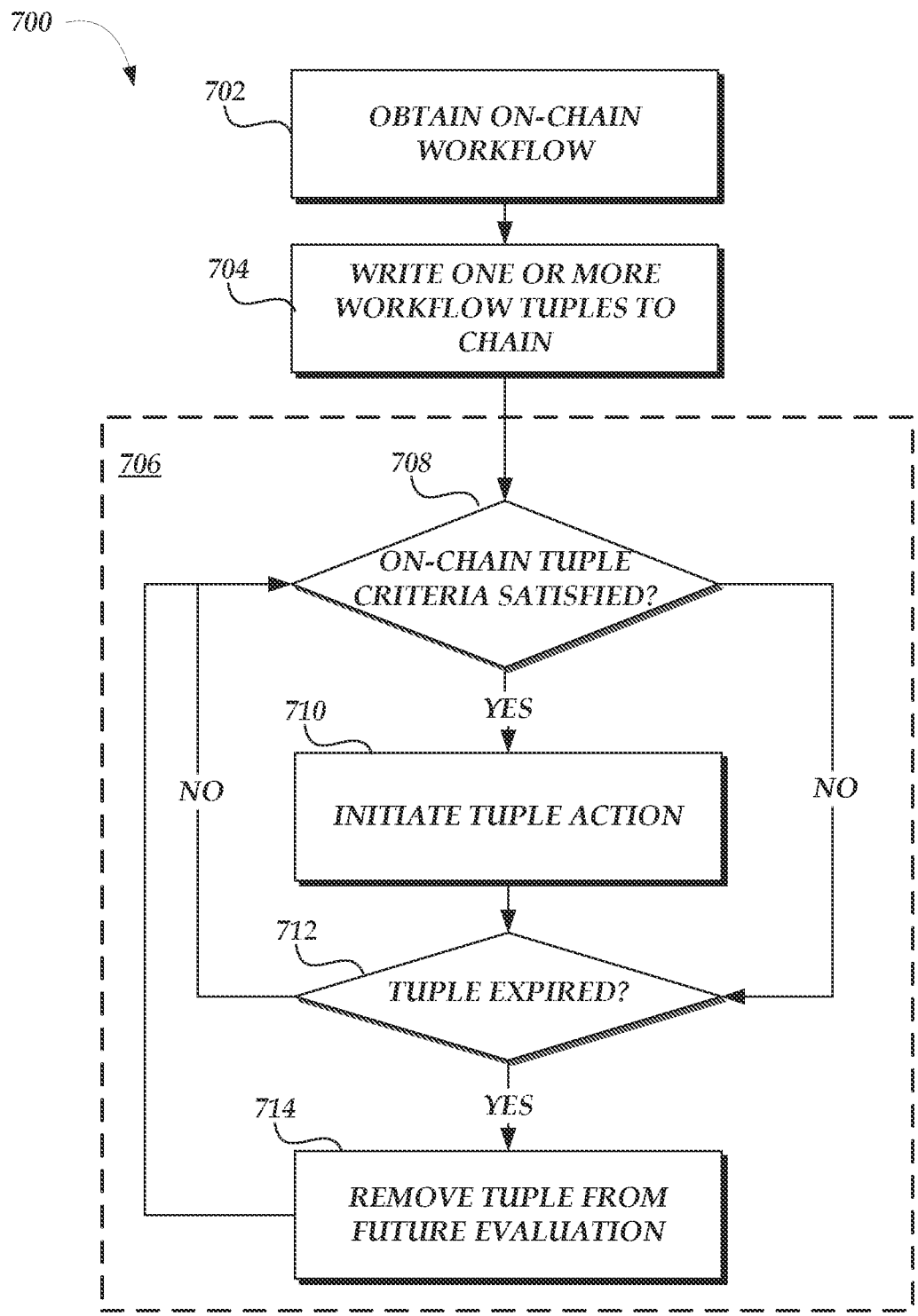
FIG. 7 depicts an illustrative routine for implementing on-chain workflows, in accordance with embodiments of the present disclosure.

With reference to FIG. 7, an illustrative routine 700 for implementing on-chain workflows will be described. The routine 700 may be implemented, for example, by a consensus node 202, one or more participation nodes 210, or a combination thereof.

The routine 700 begins at block 702, where a node obtains an on-chain workflow. Illustratively, a client, using a client computing device 102, may submit an on-chain workflow to a frontend 222 of a participant node 210 for inclusion on a blockchain. In one embodiment, the workflow may be authored as a set of tuples (e.g., rounds, actions, arguments). In another embodiment, the frontend 222 may be authored in a different format, and the frontend 222 may be configured to convert the workflow into a set of tuples. Illustratively, each tuple may represent a step (e.g., a state within a state machine or state diagram) within the workflow, with inputs and outputs to the block represented as state data encoded into the distributed ledger, external data, or a combination thereof.

Thereafter, at block 704, the node may write the set of tuples representing the workflow to the blockchain as a transaction. For example, a participant node 210 may submit the tuple as a proposed transaction in accordance with the interactions of FIG. 3. The workflow may thus be directly encoded onto the blockchain, providing visibility into the workflow by participant nodes 210.

The routine 700 then proceeds to loop 706, which illustratively occurs on each blockchain round. For example, loop 706 may occur once for each new block added to the blockchain. While shown as a single routine in FIG. 7, the routine 700 may in practice be divided. For example, blocks 702 and 704 may be implemented by a participant node 210 on receipt of an on-chain workflow, while blocks 708-714 may be implemented by a consensus node 202 during each round. Illustratively, blocks 708-714 may be implemented by a consensus verify function 206 or a consensus apply function 208, such as during the interactions of FIG. 3 (e.g., between interactions (7) and (8) or interactions (8) and (9) of FIG. 3).

At block 708, the node determines whether criteria of any on-chain tuples are satisfied. As noted above, each tuple may include criteria for when the tuple should be implemented, such as one or more rounds (e.g., identified by block height). In one embodiment, on writing a tuple to the blockchain, a node may maintain an indicator of the tuple in a current world state for the blockchain. As noted below, the tuple may then be removed from the world state on expiration of the tuple (e.g., when the highest round indicated by the tuple has passed). Thus, on each round, the node may evaluate pending tuples, as indicated in the current world state, at block 708. If the tuple criteria are satisfied, the routine 700 proceeds to block 710. Otherwise, the routine 700 proceeds to block 712.

While rounds are one example of tuple criteria, others are possible. For example, tuple criteria may include one or more rounds in combination with other criteria, such as values for entries in the world state, values of external data items, etc. In other embodiments, criteria may be limited to round criteria, and other criteria may be specified as part of the logic of an action indicated by the tuple (e.g., an action may specify that additional criteria should be evaluated, and that specific logic should be implemented if the additional criteria are satisfied). In some instances, criteria may, additionally or alternatively to state criteria (e.g., round criteria, data value criteria, etc.) include prerequisite action criteria. Illustratively, a tuple may include criteria that designate one or more transactions (e.g., by transaction type, a change in value submitted in the transaction, etc.), such that the criteria are satisfied when a matching transaction is proposed, accepted, etc. In this regard, block 708 may occur subsequent to determining transactions to be included in a current round, or may occur multiple times within a given round (e.g., on evaluating each transaction).

At block 710, if tuple criteria are satisfied, the node initiates the tuple action. As noted above, the action may correspond to logic, such as code, that is implemented to achieve desired processing. In one embodiment, the node may support execution of logic directly. For example, the node may accept logic in the form of code executable on the node. Additionally or alternatively, logic may be external, such as in the form of a verified compute function. Initiation of the tuple action can further include passing to the logic arguments, which may be specified in the tuple as, for example, static values, variable values indicated by the distributed ledger, variable values indicated by external data, etc. Implementation of block 710 may thus correspond to implementation of any wide variety of user-specified logic, such as logic corresponding to an individual stage of a workflow. While described in connection with a single tuple, block 710 may include implementation of logic of multiple tuples, such as all tuples with criteria satisfied at block 708.

Thereafter, at block 712, the node evaluates whether any tuple criteria have expired, such that the criteria could not be met in the future. For example, the node may compare a current round to the highest round indicated in tuple criteria, and identify a tuple as expired if the current round exceeds that highest round. If so, the routine 700 proceeds to block 714, where expired tuples are removed from future evaluations. For example, the node may remove the expired tuples from a list of pending tuples (e.g., maintained as part of current world state), such that the expired tuples are not evaluated at block 708 during future implementations of the loop 706. The routine 700 then returns to block 708, as discussed above.

Accordingly, via implementation of the routine 700, the node may implement a variety of potentially complex workflows on-chain, in a verifiable manner, and potentially without such workflows being subject to time constraints. For example, unlike some "smart contracts" that are executable "on chain" on various blockchains, the on-chain workflows described herein may occur over multiple rounds (e.g., across multiple blocks). Thus, the on-chain workflows may be used to implement functionality not possible via such smart contracts. Similarly, serverless functions may be subject to time durations, and workflows may thus be used to implement logic spanning a duration beyond such durations.

While described above with reference to workflows, tuples may additionally or alternatively be used to implement "smart triggers," triggering functionality on the blockchain when specific conditions are met. Similarly to workflows, each smart trigger can correspond to one or more tuples each indicating criteria, actions, and arguments. In one embodiment, smart triggers are distinguished from workflows in that workflows are represented as multiple tuples, while triggers are represented as a single tuple. Further, smart triggers may be distinguished from workflows in that workflows utilize a set of rounds as criteria, while smart triggers may not—for example, a smart trigger may remain in effect indefinitely until deactivated (e.g., by submission of a transaction that deactivates the smart trigger). Additionally or alternatively, smart triggers may include unbounded round criteria, such that round criteria is satisfied in each round. Similarly to the description above, each smart trigger may include a variety of criteria, such that a trigger is triggered, for example, when a value of a data item in current world matches one or more specified values, when a transaction is proposed or accepted, or the like.

In some instances, it may be beneficial to support both synchronous and asynchronous logic within tuples (or even within a single tuple). For example, long-running workflows may generally operate on asynchronous logic, such that logic of the workflow is executed without inhibiting addition of blocks to the blockchain. However, it may be beneficial for some operations, such as smart triggers, to execute synchronously. In one embodiment, each tuple may include an additional value indicating whether the action of the tuple is to execute synchronously or asynchronously, and a node (e.g., the consensus node 202) is configured to implement the action accordingly. For example, the node may determine that a given tuple, indicated as synchronous, includes satisfied criteria, and may complete the action of the tuple prior to adding new blocks to the blockchain. In one embodiment, a node may implement an action synchronously by completing the action prior to adding a current block to the blockchain (e.g., by adding to the block a transaction indicating completion of the action for the tuple). In another embodiment, a node may implement an action synchronously by adding addition intermediary blocks between a block whose transactions caused the tuple criteria to be satisfied and a subsequent block. For example, if a transaction in block number n satisfied criteria for a tuple with a given action, the node may implement the action and record completion of the action in block n.1, which represents an intermediary block between block number n an block number n+1. Illustratively, block n.1 may be used to record completion of all actions corresponding to tuple's whose criteria was satisfied by transactions in block n. In some instances, intermediary blocks may exclude any participant-proposed transactions, may include only transactions triggered by transactions of a subsequent block via a tuple. In some embodiments, a node may support multiple intermediary blocks. For example, a transaction of a block n.1 may satisfy tuple criteria resulting in implementation of an action whose completion is recorded in block n.2, which may satisfy tuple criteria resulting in implementation of an action whose completion is recorded in block n.3, etc. A node may illustratively place a "maximum depth" on intermediary blocks, such that a given standard block (e.g., n) can result in no more than a maximum number of intermediary blocks.

Figure 8:
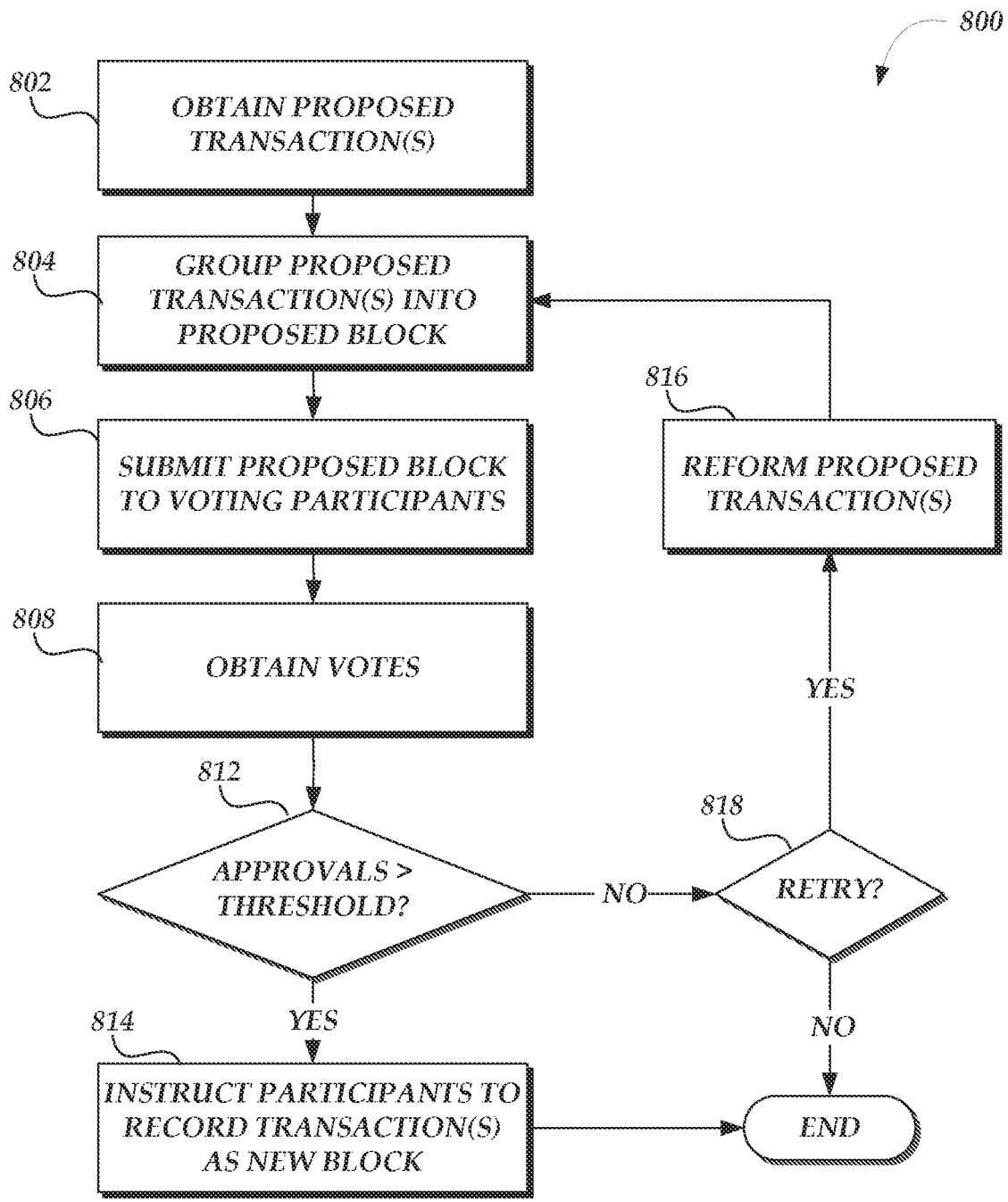
FIG. 8 depicts an illustrative routine for efficiently appending blocks to a blockchain, in accordance with embodiments of the present disclosure.

With reference to FIG. 8, an illustrative routine 800 for efficiently appending blocks to a blockchain will be described. The routine 800 may be implemented, for example, by a consensus node 202 of a blockchain system. In accordance with the description above, implementation of the routine 800 may for example avoid the inefficiencies incurred or limitations imposed by other techniques for addition of blocks to a blockchain, such as by avoiding duplicative processing incurred via proof of work algorithms or application restrictions incurred via proof of stake algorithms. More specifically, the routine 800 may be implemented by a consensus node 202 on the basis of execution of code hosted by a hosted computing environment in a verifiably immutable manner and trusted by participants to the blockchain. Thus, implementation of the routine 800 via execution of such code can enable selection of transactions for inclusion in a new block in a manner trusted by participants, without requiring duplicative processing by such participants.

The routine 800 begins at block 802, where the consensus node 202 obtains one or more proposed transactions. As noted above, proposed transactions may illustratively be received from participant nodes 210 that, collectively with the consensus node 202, represent a blockchain system. Each transaction may illustratively be proposed to a participant node 210 via a client computing device 102. In one embodiment, the participant nodes 210 are configured to validate such transactions prior to submission to the consensus node 202, such as by verifying that the transaction complies with current rules (e.g., encoded on the blockchain).

As noted above, each proposed transaction may include one or more modifications to the distributed ledger represented by the blockchain, such as adding data objects or values of data objects, changing values of a data object, deleting a data object or its values. In some embodiments, proposed transactions may include conditional modifications, such that a modification to a value is conditional on, for example, other values within the ledger. In some embodiments, transactions may include invocations of smart contracts or creation or modification of smart workflows. For example, a transaction may include a reference to a particular set of code, such as code stored as on-chain data, stored as chain-adjacent data, or stored as a verifiably immutable set of code held at a cloud provider network 120, along with parameters for invoking that code. In further embodiments, transactions may relate to off-chain or chain adjacent data, such as a request for data to be shared among participants to the blockchain as chain-adjacent data. Still further, transactions may include modifications to metadata that alter subsequent operation of the blockchain system. Illustratively, a transaction may propose a change to permissions for data of the distributed ledger represented by the blockchain, a change to a schema for the distributed ledger, a change to the verifiably immutable code executed to implement the routine 800, a change to rules encoded within the blockchain for evaluating transactions, a change to participant nodes 210, the consensus node 202, allowed cloud provider networks 120, or the like. Each transaction may further include transaction metadata, such as a party proposing the transaction and information enabling the transaction to be authenticated, such as a digital signature of the party proposing the transaction (e.g., generated from a private key of the party proposing the transaction, and verifiable via a corresponding public key). Thus, transactions may include any of a variety of modifications that control data stored within the distributed ledger represented by the blockchain, topology of the blockchain (e.g., modification of participants), or operation of the blockchain system itself.

In one embodiment, transactions are submitted individually. In another embodiment, transactions may be submitted in batches. Further, in some embodiments batches of multiple transactions may be designated as interrelated and atomic. For example, a node 210 may submit a set of transactions that are intended to be entered in order within a single block, such that none of the set is entered unless all are entered. Illustratively, node 210 may specify that the set of transactions must satisfy properties of atomicity, consistency, isolation, and durability (ACID).

At block 804, the consensus node 202 groups one or more proposed transactions into a proposed block. That is, the consensus node 202 selects one or more of the proposed transactions to group together into a subsequent block to be added to the blockchain. Grouping may occur based on a variety of criteria. For example, the consensus node 202 may validate individual transactions to ensure that such transactions are permitted (e.g., that a proposed party has permissions to submit the transaction). As another example, the consensus node 202 may validate individual transactions to verify the transactions are well formed and that the transactions do not leave the distributed ledger in a disallowed state (e.g., with a negative value for a field that disallows negative values). As yet another example, the consensus node 202 may further verify that the combination of transactions is cycle-free (e.g., that a digraph formed by nodes corresponding to participants with transactions in the combination and edges corresponding to flows of balances is cycle free) and that the transactions are either order-agnostic or correctly ordered (e.g., that when two transactions of the same participant require a specific ordering, that this ordering is maintained, or that when two unrelated transactions are combined within a group, that an end state of the ledger does not depend on an ordering of the two unrelated transactions, which may be referred to as a requirement for "commutativity" and "associativity" among transactions of a block). Still further examples include validation of uniqueness (e.g., that a transaction does not create two objects, such as within the blockchain or chain adjacent data, with a shared unique identifier like a "primary key" or file name) and foreign integrity constraints (e.g., that a reference designated as a foreign key in a first object references a known primary key of a second object stored in the chain).

Still further, the node 202 may group transactions to satisfy requirements for the transactions specified by a proposing participant node 210. For example, where transactions are required to satisfy the ACID properties node above, the node 202 can be configured to include all relevant transactions within a block and maintain ordering of the transactions within the block to satisfy such properties.

As noted above, in the instance that an individual transaction is not valid, the consensus verify function 206 may decline the transaction, such as by returning the transaction to a proposing participant node 210, adding the transaction to a queue of failed transactions, or otherwise notifying a participant that the transaction failed. In another embodiment, the consensus verify function 206 may be configured to record failed or misconfigured submissions to all nodes 210 or a subset of nodes 210 beyond the proposing participant node 210. In still another embodiment, failed transactions may be recorded storage accessible by the proposing participant node 210 (e.g., the node 210's chain adjacent data 214). In yet another embodiment, the consensus verify function 206 may be configured programmatically repair resubmit transactions where possible. For example, where a transaction fails due to a duplicate unique identifier, the consensus verify function 206 may be configured to modify the transaction to assign a new unique identifier.

In the instance that a combination of transactions is not valid, the consensus verify function 206 may similarly decline the transaction, or alternatively may divide a problematic combination of transactions between different proposal groups, corresponding to different blocks in the chain. For example, where an individual transaction is not invalid individually, but fails due to interaction with other transactions, the consensus verify function 206 may "hold" the individual transaction until a next round of proposals to ensure that requirements of a combination of transactions (e.g., commutativity and associativity) are adhered to.

Thereafter, at block 806, the consensus node 202 submits the proposed transaction to voting participant nodes 210. In one embodiment, the proposed transaction is submitted to all nodes 210. In another embodiment, the proposed transaction is submitted to less than all nodes 210, such as a subset of nodes 210 selected according to load-balancing criteria (e.g., x % of nodes in a random fashion, according to round robin selection, etc.) or a subset of nodes 210 selected according to the transactions (e.g., nodes 210, or a subset thereof 210, with permissions relevant to the transaction, such as permissions to view a data object modified by the transactions). As discussed above, participant nodes 210 can thereafter evaluate the proposed transactions. For example, each function 218 may obtain blockchain metadata that describes policies agreed on by all blockchain participants, and validate the transactions against the policies. In some embodiments, each function 218 may further evaluate individual transactions and the group of transactions according to the verifications noted above, such as by validating the transactions are well formed, result in a valid ledger state, are cycle free, and are either order-agnostic or correctly ordered. Still further, in some embodiments, participant nodes 210 may apply customized and potentially participant-specific policies for determining transactions votes. In the event that transactions meet the relevant requirements, a participant node 210 can generate a yes vote. In the event that transactions do not meet the relevant requirements, the participant node 210 can generate a no vote. In one embodiment, a vote may be for a group of transactions, as a slate. In such an embodiment, a node 210 may optionally indicate specific transactions within the slate that are rejected, resulting in a no vote. In another embodiment, each transaction may be voted on individually. Accordingly, each participant node 210 is afforded a vote as to any changes to the blockchain. During evaluation, proposed transactions may be persisted to durable storage of a participant node 210 to facilitate later commitment, forming a first phase of a 2-phase commit protocol.

At block 808, the consensus node 202 obtains votes from the individual participant nodes 210, and evaluates the votes at block 812 to determine whether approvals meet a threshold. The particular threshold may vary across implementations. For example, the threshold in one implementation is unanimity, while the threshold in another is a bare majority, a super majority (e.g., 60%, two thirds, 80%, 90%, etc.). Illustratively, the relevant threshold may be agreed on by blockchain participants, and recorded in an existing block of the blockchain. In some cases, the threshold may vary according to the type of transaction. For example, modifications to metadata that alter operation of the blockchain (such as a modification to the threshold as applied to future transactions) may require a super majority or unanimity, while a modification to a non-metadata data object may require a bare majority or lower super majority. In yet another example, thresholds may be participant-specific. For example, where a particular data object is owned by a particular user, the threshold may be approval by that user (e.g., by a given percentage of nodes 210 operated by the user). As another example, where a particular data object is viewable only by a subset of nodes 210, a threshold may be set relative to those nodes 210 that have permissions to view the data object.

If approvals do not meet the threshold, the routine 800 proceeds to block 818, where the consensus node 202 determines whether to retry the proposed transactions. Illustratively, the node 202 may elect to retry proposed transactions a configured number of times before failing. Alternatively or additionally, a node 202 may elect to retry transactions where a voting participant node 210 indicated a curable reason for disapproving of at least one of the one or more transactions. For example, where a participant node 210 indicated disapproval of a single transaction within a group of transactions, the consensus node 202 may retry in order to re-group transactions to execute the disapproved transaction.

If the consensus node 202 determines not to retry the transactions, the routine 800 ends thereafter. In some embodiments, the consensus node 202 may further instruct participant nodes 210 to record the failure of the transactions. For example, the consensus node 202 may instruct the participant nodes 210 to record the failure as a standalone block, or may locally record the failure and include the failure for recordation as a transaction in a subsequent block (with one or more additional transactions).

If the consensus node 202 determines to retry the transactions, the routine 800 proceeds to block 816, where the consensus node 202 reforms the proposed transactions. For example, the consensus node 202 may remove one or more transactions from the group of proposed transactions to avoid disapproval of such transactions (or the group) by participant nodes 210. The routine 800 then returns to block 804 as described above.

If, at block 812, the votes indicate approvals sufficient to satisfy the threshold, the routine 800 instead proceeds to block 814, where the consensus node 210 instructs participant nodes 210 to record the approved transactions as a new block in the blockchain (e.g., by generating the block and recording it to respective chain data 216). The participant nodes 210, in turn, can process the transactions to generate the new block, thus appending the block to the blockchain. In one embodiment, the new block includes additional data regarding implementation of the routine 800, such as the votes obtained at block 808 and validating information for participant nodes 210 who provided such votes (e.g., digital signatures of each voting node 210). The routine 800 then ends.

Notably, implementation of the routine 800 enables a single node—the consensus node 202—to select those transactions included in a subsequent block of the blockchain, and for other nodes (e.g., the participant nodes 210) to trust the algorithm by which the single selected such transactions (e.g., by virtue of the consensus node 202 being implemented by verifiably immutable code that is subject to audit and review), thus avoiding the computational redundancy of protecting against a flawed or malicious consensus node implementation and avoiding duplicative processing incurred by alternative block creation techniques. Moreover, because the routine 800 may be implemented by execution of trusted, verifiably immutable code, creation of blocks does not inhibit security guarantees of the blockchain. Accordingly, the routine 800 can provide significant improvements over past consensus mechanisms for creating blocks.

One skilled in the art will appreciate that the routine 800 may be altered or expanded in various ways, as disclosed herein. For example, as noted above, in some embodiments the consensus node 202 or participant nodes 210 includes within blocks additional data, such as metrics regarding operation of the blockchain system. As another example, the consensus node 202 may, in addition to instructing participants 210 to record transactions, implement further functionality, such as invocation of smart contracts, evaluation and invocation of smart workflows or triggers, and the like. Thus, implementation of the routine 800 can provide for a wide variety of functionalities, including those provided by known blockchain implementations and additional functionalities as disclosed herein, while providing significant efficiency gains relative to known blockchain implementations.

Figure 9:
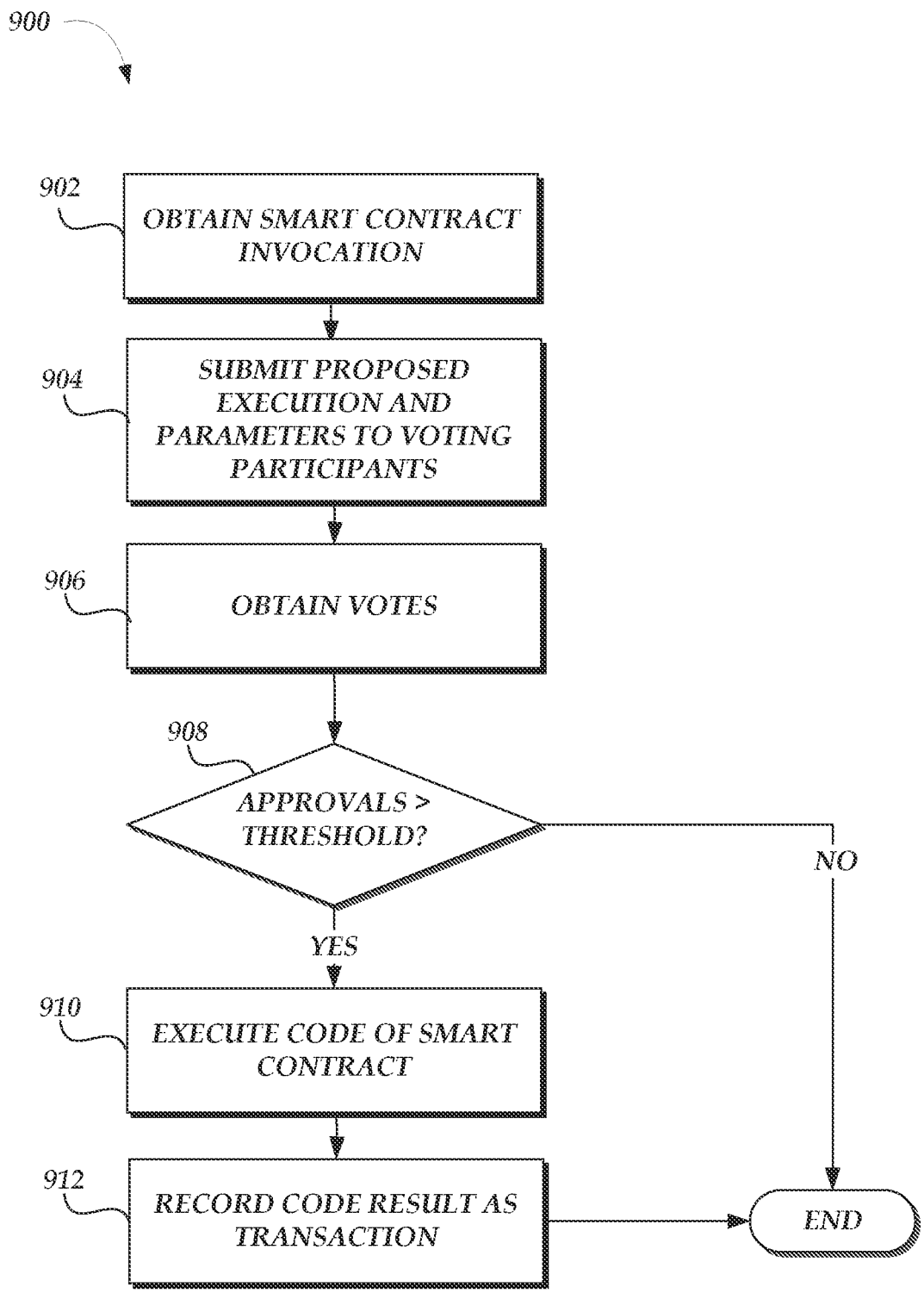
FIG. 9 depicts an illustrative routine for efficiently implementing smart contracts in a blockchain system, in accordance with embodiments of the present disclosure.

With reference to FIG. 9, an illustrative routine 900 for efficiently implementing smart contracts in a blockchain system will be described. As noted above, smart contracts correspond to computer-executable code that generally modify the distributed ledger represented by a blockchain, such as by adding, deleting, or modifying a data object stored in the ledger. In some known blockchain implementations, execution of a smart contract can require each participant to the blockchain to independently execute the code to validate a result of that execution. As a result, efficiency of such a blockchain system detrimentally declines as a number of participants grows. In contrast, the routine 900 provides for efficient smart contract execution, enabling a smart contract to be executed once, potentially in parallel among multiple computing devices.

The routine 900 may be implemented, for example, by a consensus node 202 of a blockchain system. Similarly to the routine 800 described above with reference to FIG. 8, the routine 900 may be implemented on the basis of execution of code hosted by a hosted computing environment in a verifiably immutable manner and trusted by participants to the blockchain. Thus, implementation of the routine 900 via execution of such code can enable implementation of smart contracts in a manner trusted by participants, without requiring duplicative processing by such participants.

The routine 900 begins at block 902, where the consensus node 202 obtains invocation of a smart contract. The invocation is illustratively included within a transaction to the blockchain. In one embodiment, the routine 900 is implemented as a sub-routine to routine 800 of FIG. 8. For example, where the consensus node 202 determines that sufficient approval has been received for a transaction invoking a smart contract (e.g., at block 812 of FIG. 8), the node 202 may implement the routine 900 with respect to that invocation (e.g., subsequent to block 812 of FIG. 8, such as in parallel with block 814).

In one embodiment, the invocation includes the code executable to implement the smart contract. In another embodiment, the invocation references the code, such as by reference to a prior block on the blockchain including the code or by reference to a serverless function stored on a cloud provider network 120. Where the code is not itself stored in a verifiably immutable manner, the routine 900 may include obtaining a copy of the code and storing the code at the consensus node 202 such that the code is verifiably immutable during the routine 900. The invocation illustratively also includes parameters for passing to the code. Parameters may for example include static values encoded within the invocation, references to values stored in the distributed ledger, or references to external values (e.g., stored in data storage servers 110). Similarly to the code itself, where parameters are not verifiably immutable, the routine 900 may include obtaining a static values for the parameters such that the parameters are verifiably immutable during the routine 900.

At block 904, the consensus node 202 submits the proposed execution and parameters to one or more participant nodes 210. In one embodiment, the proposed execution is submitted to all nodes 210. In another embodiment, the proposed execution is submitted to less than all nodes 210, such as a subset of nodes 210 selected according to load-balancing criteria (e.g., x % of nodes in a random fashion, according to round robin selection, etc.) or a subset of nodes 210 selected according to the execution (e.g., nodes 210, or a subset thereof 210, with permissions to invoke the smart contract, permissions to view results of smart contract execution, or permissions relevant to potential modifications to the distributed ledger made by the smart contract, such as permissions to view a data object potentially modified by the smart contract). Each participant node 210 can then validate the proposed execution and parameters. For example, each node 210 may obtain blockchain data and evaluate the proposed execution and parameters against the data, such as by verifying that the code of the smart contract is accessible and acceptable, that the parameters to be passed to the smart contract are allowed, etc. Evaluation of smart contract execution and parameters may occur based on similar criteria to evaluation of transactions, as discussed above. For example, each node 210 may evaluate the execution and parameters according to criteria mutually agreed upon among nodes 210, individual criteria for a node 210, or a combination thereof. As noted above, code verification may in some instances be completed at other times. For example, a smart contract may refer to code previously stored on the blockchain, and code verification may occur during verification of a transaction submitting of that code, thus avoiding a need for code verification with each invocation. Moreover, code verification may occur on review of transactions resulting from smart contract execution, such as by verifying that a hash of the code as executed, provided by a cloud provider network 120, matches the hash of previously verified code At block 906, the consensus node 202 obtains votes from the individual participant nodes 210, and evaluates the votes at block 908 to determine whether approvals meet a threshold. Similarly to the threshold of the routine 800, the threshold of routine 900 may vary across implementations. For example, the threshold in one implementation is unanimity, while the threshold in another is a bare majority, a super majority (e.g., 60%, two thirds, 80%, 90%, etc.). Illustratively, the relevant threshold for a given smart contract or smart contracts in general may be agreed on by blockchain participants, and recorded in an existing block of the blockchain. In some cases, threshold may vary according to the type of smart contract. For example, the threshold may vary according to the type of modifications potentially made by the smart contract, by the number or type of partisan nodes 210 (or corresponding participant entities) to which invocation rights to the smart contract have been granted, etc.

If approvals do not satisfy the threshold, the smart contract is disallowed and the routine ends. In some embodiments, the consensus node 202 may further instruct participant nodes 210 to record the failure of the smart contract invocation. For example, the consensus node 202 may instruct the participant nodes 210 to record the failure as a standalone block, or may locally record the failure and include the failure for recordation as a transaction in a subsequent block (with one or more additional transactions).

If, at block 812, the votes indicate approvals sufficient to satisfy the threshold, the routine 800 instead proceeds to block 814, where the consensus node 210 executes the code of the smart contract. For example, the consensus node 210 may locally execute the code, invoke a serverless function on a cloud provider network 120 corresponding to the code, etc. In one embodiment, the consensus node 202 may instruct a participant node 210 to execute the smart contract. Illustratively, participant node 210 execution may enable the contract code to access resources of the participant node 210 that may not be available to the consensus node 202 or other participants. Thus, functionality of the code is implemented to satisfy invocation of the smart contract.

Thereafter, at block 912, the consensus node 202 causes results of the execution to be recorded as one or more transactions on the blockchain. For example, where the execution results in one or more modifications to the distributed ledger, the node 202 may cause such modifications to be submitted as transactions (e.g., handled according to the discussion above). The results may further include related data regarding the execution, such as a signature of an executing party (e.g., the consensus node 202, a cloud provider network 120, etc.) verifying that the code was executed in a trusted manner. In the instance that the smart contract fails, that failure may be recorded as a result of the execution. Various additional information may be included in the result, such as a return value of the execution, metrics regarding the execution, error messages provided by or exceptions thrown by the execution, or the like.

In one embodiment, the node 202 transmits results of the execution to participant nodes 210 for recordation. As discussed above (e.g., with reference to FIG. 3), such nodes 202 may validate the results prior to recordation. For example, such nodes 202 may verify that the results are properly signed by a trusted party. In another embodiment, the node 202 directly submits results as transactions (e.g., to a transaction queue, as discussed above). Where the node directly submits transactions, the routine 900 may include an additional round of voting (e.g., similar to blocks 904-908, with respect to the results) to ensure that a threshold number of participant nodes 210 approve of recording the results to the blockchain.

Accordingly, implementation of the routine 900 can enable a blockchain system to implement a smart contract by executing code corresponding to the smart contract a single time, rather than requiring that each participant to the blockchain independently execute the code. Moreover, the single execution may be implemented on a hosted computing environment, and thus distributed across multiple underlying computing devices. In some embodiments, multiple executions may occur concurrently, thus enabling a single smart contract to be separately invoked multiple times and implemented in parallel. Accordingly, the routine 900 can significantly increase efficiency of implementing smart contracts on blockchains. Moreover, because each execution can occur on effectively unbounded cloud resources, the routine 900 provides for high scalability not limited by resources of an individual computing device. Still further, because the execution occurs on a hosted computing environment that verifies immutability of the code and provides for trusted execution of the code, the routine 900 provides many or all of the benefits of known smart contract implementations.

One of ordinary skill in the art will appreciate that various modifications may be made to FIG. 9. In addition to or alternatively to those modifications discussed elsewhere, as another example, a consensus node 202 may in some embodiments provide for locking of data objects used as parameters to or potentially modifiable by a smart contract. The consensus node 202 may further ensure operational criteria for such locks, such as by ensuring that locks, when expressed as a directed graph, remain acyclic across smart contract invocation. Illustratively, a smart contract may be associated with defined inputs and outputs on the distributed ledger. On obtaining a smart contract invocation (e.g., at block 902), the consensus node 202 may disallow subsequent modifications to the inputs, the outputs, or a combination thereof. In one embodiment, whether an input or output is locked is defined within the smart contract. As described above, the routine 900 is generally contemplated to occur asynchronously to block creation, such that implementation of the routine 900 does not inhibit block creation. For example, when implemented as a subroutine to the routine 800, the routine 900 may not halt the routine 800 but may run concurrently to the routine 800. However, in some embodiments the routine 900 may occur synchronously to block creation, such that the consensus node 202 halts creation of new blocks while the routine 900 occurs. For example, when implemented as a subroutine to the routine 800, the routine 900 may halt the routine 800 until the routine 900 ends. In some embodiments, the consensus node 202 may be configured to provide for both synchronous and asynchronous execution of smart contracts as, e.g., designated in a given contract. The node 202 may illustratively place restrictions on specific types of execution. For example, the node 202 may require that synchronous contracts include only code directly implemented by the consensus node 202, as opposed for example to a distinct serverless function. Such restrictions may ensure that synchronous contracts execute rapidly, without inhibiting future block creation. Various additional modifications are possible.

Figure 10:
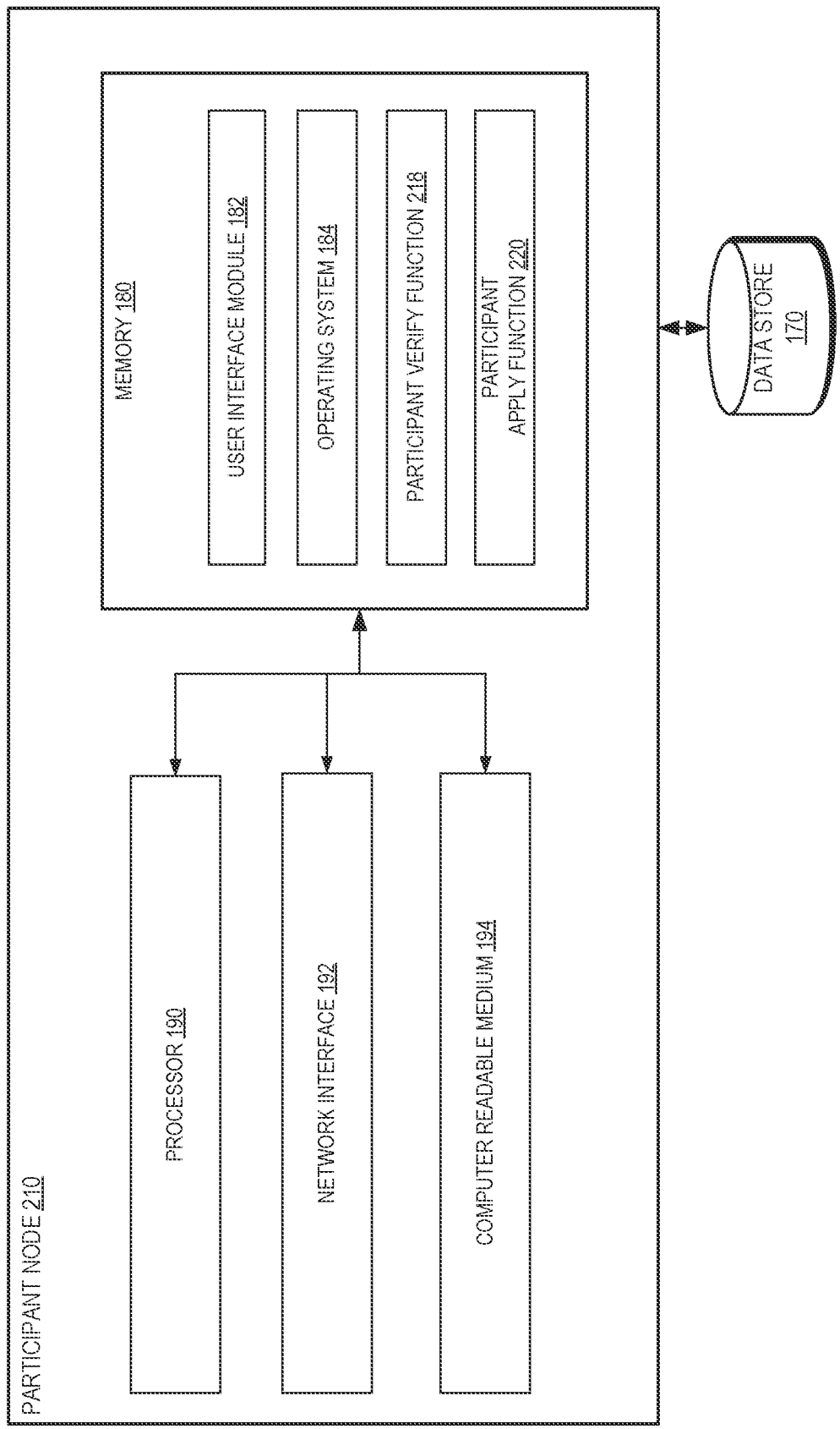
FIG. 10 depicts an example architecture of a computing system that can be used to perform one or more of the techniques described herein.

FIG. 10 depicts an example architecture of a computing system (referred to as a participant node 210) that can be used to perform one or more of the techniques described herein or illustrated in FIGS. 1-9. The general architecture of the participant node 210 depicted in FIG. 10 includes an arrangement of computer hardware and software modules that may be used to implement one or more aspects of the present disclosure. The participant node 210 may include many more (or fewer) elements than those shown in FIG. 10. It is not necessary, however, that all of these elements be shown in order to provide an enabling disclosure. As illustrated, the participant node 210 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIGS. 1 and 2.

The processor 190 may also communicate with memory 180. The memory 180 may contain computer program instructions (grouped as modules in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of participant node 210. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 may include participant verify function 218 and a participant apply function 220 to conduct blockchain operations as noted above. While not shown in FIG. 10, the memory 180 may additionally or alternatively include functions of a consensus node 202, such as a consensus verify function 206 and a consensus apply function 208. These modules, individually or in combination, may implement aspects of the disclosure discussed above. As noted above, the participant node 210 may be implemented by or under control of a trusted cloud provider providing verified immutability and execution of various blockchain functions, and particularly of the functions of the consensus node 202. In this way, implementation of blockchain functions on the consensus node 202 may be trusted by participants of the blockchain, even if such participants lack trust among one another.

While modules of FIG. 10 are shown as part of a participant node 210, in other embodiments, all or a portion of these modules may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the participant node 210. In some instances, a participant node 210 may be implemented as one or more virtualized devices, such as one or more virtual machines 117 on the compute servers 115. Moreover, as noted above, a participant node 210 may be implemented in whole or part as a distributed computing system including a collection of devices that collectively implement the functions discussed herein. When implemented as part of a cloud provider network 120, the account-level resources associated with a participant node 210 may be associated with a particular account under control, e.g., of an entity participating in a blockchain. Alternatively, account-level resources associated with a participant node 210 may be associated with a cloud provider, or with a third-party service provider operating to provide blockchains on behalf of end users. In some instances, different account-level resources associated with a participant node 210 may be associated with different accounts. For example, storage resources (e.g., chain data 216 and chain adjacent data 214) may be associated with an account of an end user, while compute resources (e.g., the participant verify function 218 and participant apply function 220) may be associated with a cloud provider, or with a third-party service provider. While FIG. 10 is depicted as a participant node 210, a similar device may be used to implement other elements of FIGS. 1-2. For example, a device having a similar configuration may be used to implement a consensus node 202.

Various example embodiments of the disclosure can be described by the following clauses:

Clause 1. A computer-implemented method to efficiently append blocks to a blockchain, the computer-implemented method implemented at a first computing node of a plurality of computing nodes implementing the blockchain, the computer-implemented method comprising:

executing, on a hosted computing environment, computer-executable code hosted by the hosted computing environment, wherein the hosted computing environment verifies immutability of the computer-executable code, and wherein the computer-executable code, when executed on the hosted computing environment:

obtains one or more proposed transactions to the blockchain, each proposed transactions including one or more modifications to a distributed ledger represented by the blockchain;

obtains approval of the one or more proposed transactions from at least a portion of the plurality of computing nodes, wherein approval from an individual computing node of the one or more proposed transactions indicates approval for the first computing node to select the one or more proposed transactions for inclusion in a next block appended to the blockchain;

verifies that approval of the one or more proposed transactions has been obtained from at least a threshold number of computing nodes of the plurality of computing nodes; and in response to verifying that approval of the one or more proposed transactions has been obtained from at least the threshold number of computing nodes of the plurality of computing nodes, transmits to the plurality of computing nodes an indication that the one or more proposed transactions have been approved, wherein individual computing nodes of the plurality of computing nodes are configured to respond to the indication by appending to the blockchain the next block including the one or more proposed transactions.

Clause 2. The computer-implemented method of clause 1 further comprising, at one or more of the plurality of computing nodes:

validating the one or more proposed transactions against transaction rules stored within the blockchain; and submitting approval of the one or more proposed transactions to the first node.

Clause 3. The computer-implemented method of clause 2, wherein the one or more of the plurality of computing nodes includes the first computing node.

Clause 4. The computer-implemented method of clause 1, wherein the computer-executable code hosted by the hosted computing environment is identified within the blockchain by at least one of a hash value of the code or a unique identifier of the code on the hosted computing environment.

Clause 5. The computer-implemented method of clause 1, wherein the computer-executable code hosted by the hosted computing environment is identified within an initial block the blockchain.

Clause 6. The computer-implemented method of clause 1, wherein the computer-executable code hosted by the hosted computing environment is identified within a non-initial block the blockchain, and wherein the non-initial block of the blockchain indicates approval of a transition to the computer-executable code from a prior set of computer-executable code that is identified within an initial block the blockchain.

Clause 7. A computing system comprising:

a data store of a hosted computing environment, the data store computer-executable code hosted by the hosted computing environment, wherein the hosted computing environment verifies immutability of the computer-executable code; and one or more processors of the hosted computing environment configured to execute the computer-executable code, wherein execution of the computer-executable code by the one or more processors causes the system, acting as a first computing node a plurality of computing nodes implementing a blockchain, to:

obtain one or more proposed transactions to a blockchain, each proposed transactions including one or more modifications to the blockchain;

obtain approval of the one or more proposed transactions from at least a portion of the plurality of computing nodes, wherein approval from an individual computing node of the one or more proposed transactions indicates approval for the first computing node to select the one or more proposed transactions for inclusion in a next block appended to the blockchain;

verify that approval of the one or more proposed transactions has been obtained from at least a threshold number of computing nodes of the plurality of computing nodes; and in response to verifying that approval of the one or more proposed transactions has been obtained from at least the threshold number of computing nodes of the plurality of computing nodes, cause the one or more proposed transactions to be added to the blockchain as a next block of the blockchain.

Clause 8. The computing system of clause 7, wherein causing the one or more proposed transactions to be added to the blockchain as the next block of the blockchain includes transmitting an instruction to the plurality of computing nodes to add the one or more proposed transactions to the blockchain as the next block.

Clause 9. The computing system of clause 8, wherein the instruction to the plurality of computing nodes to add the one or more proposed transactions to the blockchain as the next block includes a digital signature of the hosted computing environment that authenticates the execution of the computer-executable.

Clause 10. The computing system of clause 7, wherein the computer-executable code is a serverless function, and wherein the execution of the computer-executable code is an execution of the computer-executable code on a serverless compute system of the hosted computing environment.

Clause 11. The computing system of clause 7, wherein the threshold number of computing nodes is all computing nodes.

Clause 12. The computing system of clause 7, wherein the threshold number of computing nodes is a quorum of less than all computing nodes.

Clause 13. The computing system of clause 7, wherein the threshold number of computing nodes is defined within the blockchain.

Clause 14. The computing system of clause 7, wherein execution of the computer-executable code by the one or more processors further causes the system to validate the one or more proposed transactions against transaction rules stored within the blockchain.

Clause 15. The computing system of clause 14, wherein the transaction rules stored within the blockchain define a permitted format of data stored within a distributed ledger represented by the blockchain.

Clause 16. One or more non-transitory computer-readable media comprising computer-executable code hosted by a hosted computing environment, wherein the hosted computing environment verifies immutability of the computer-executable code, and wherein the computer-executable code, when executed by one or more processors of the hosted computing environment acting as a first computing node of a plurality of computing nodes implementing a blockchain, causes the hosted computing environment to:

obtain one or more proposed transactions to the blockchain, each proposed transactions including one or more modifications to the blockchain;

obtain approval of the one or more proposed transactions from at least a portion of the plurality of computing nodes, wherein approval from an individual computing node of the one or more proposed transactions indicates approval for the first computing node to select the one or more proposed transactions for inclusion in a next block appended to the blockchain;

verify that approval of the one or more proposed transactions has been obtained from at least a threshold number of computing nodes of the plurality of computing nodes; and in response to verifying that approval of the one or more proposed transactions has been obtained from at least the threshold number of computing nodes of the plurality of computing nodes, cause the one or more proposed transactions to be added to the blockchain as a next block of the blockchain.

Clause 17. The one or more non-transitory computer-readable media of clause 16, wherein the computer-executable code, when executed by the one or more processors of the hosted computing environment acting as the first computing node of the plurality of computing nodes, further causes the hosted computing environment to identify the plurality of computing nodes from the blockchain.

Clause 18. The one or more non-transitory computer-readable media of clause 16, wherein the computer-executable code, when executed by the one or more processors of the hosted computing environment acting as the first computing node of the plurality of computing nodes, further causes the hosted computing environment to identify the plurality of computing nodes from the blockchain as a subset, of computing nodes participating in the blockchain, with permissions to view one or more data objects modified by the one or more proposed transactions.

Clause 19. The one or more non-transitory computer-readable media of clause 16, wherein the computer-executable code, when executed by the one or more processors of the hosted computing environment acting as the first computing node of the plurality of computing nodes, further causes the hosted computing environment to cause one or more metrics regarding operation of the first computing to be added to the blockchain in the next block of the blockchain.

Clause 20. The one or more non-transitory computer-readable media of clause 16, wherein the one or more transactions include a modification to rules stored within the blockchain that modify subsequent operation of the first computing node.

Clause 21. The one or more non-transitory computer-readable media of clause 16, wherein the one or more transactions include addition of a confidential data value to the blockchain, and wherein causing the one or more proposed transactions to be added to the blockchain as the next block of the blockchain includes adding to the next block at least one of a token representation of the confidential data value or an encrypted version of the confidential data value.

Clause 22. The one or more non-transitory computer-readable media of clause 16, wherein a prior block of the blockchain includes a confidential data value, and wherein causing the one or more proposed transactions to be added to the blockchain as the next block of the blockchain includes cryptographically linking the next block to the prior block based at least partly on a representation of the prior block excluding the confidential data value.

Various additional example embodiments of the disclosure can be described by the following additional clauses:

Clause 1. A computer-implemented method to efficiently execute a smart contract on a blockchain, the computer-implemented method implemented at a first computing node of a plurality of computing nodes implementing the blockchain, the computer-implemented method comprising:
obtaining a proposed transaction to the blockchain, the proposed transaction including invocation of the smart contract, wherein the smart contract corresponds to a computer-executable code hosted by a hosted computing environment that verifies immutability of the computer-executable code;
obtaining approval of the proposed transaction from at least a portion of the plurality of computing nodes, wherein approval from an individual computing node of the proposed transaction indicates approval for the first computing node to execute the smart contract on behalf of the individual computing node;
verifying that approval of the proposed transaction has been obtained from at least a threshold number of computing nodes of the plurality of computing nodes; and
in response to verifying that approval of the proposed transaction has been obtained from at least a threshold number of computing nodes of the plurality of computing nodes, initiating execution of the computer-executable code on the hosted computing environment as invocation of the smart contract on the blockchain.

Clause 2. The computer-implemented method of clause 1 further comprising, at one or more of the plurality of computing nodes:
validating the proposed transaction against transaction rules stored within the blockchain; and
submitting approval of the proposed transaction to the first node.

Clause 3. The computer-implemented method of clause 1, wherein the smart contract is implemented on the blockchain via the execution of the computer-executable code on the hosted computing environment independent of any other execution of the computer-executable code.

Clause 4. The computer-implemented method of clause 1 further comprising recording a result of the execution of the computer-executable code on the hosted computing environment as one or more transactions on the blockchain.

Clause 5. The computer-implemented method of clause 4, wherein recording the result of the execution of the computer-executable code on the hosted computing environment as the one or more transactions on the blockchain comprises submitting the result of the execution to the plurality of computing nodes.

Clause 6. The computer-implemented method of clause 1 further comprising recording to the blockchain a transaction indicating that approval of the proposed transaction has been obtained from at least a threshold number of computing nodes of the plurality of computing nodes.

Clause 7. The computer-implemented method of clause 1 further comprising:
obtaining approval of one or more parameters input to the execution of the computer-executable code from at least a portion of the plurality of computing nodes, wherein approval from an individual computing node of the one or more parameters indicates approval for the first computing node to provide the one or more parameters to the execution of the computer-executable code; and
verifying that approval of the one or more parameters has been obtained from at least a second threshold number of computing nodes of the plurality of computing nodes.

Clause 8. The computer-implemented method of clause 7, wherein the threshold and the second threshold are equal.

Clause 9. A computing system comprising:
a data store including computer-executable code; and
one or more processors configured to execute the computer-executable code, wherein execution of the computer-executable causes the system, acting as a first computing node in a plurality of computing nodes implementing a blockchain, to:
obtain a proposed transaction to the blockchain, the proposed transaction including invocation of a smart contract, wherein the smart contract corresponds to second computer-executable code hosted by a hosted computing environment that verifies immutability of the second computer-executable code;
obtain approval of the proposed transaction from at least a portion of the plurality of computing nodes, wherein approval from an individual computing node of the proposed transaction indicates approval for the first computing node to execute the smart contract on behalf of the individual computing node;
verify that approval of the proposed transaction has been obtained from at least a threshold number of computing nodes of the plurality of computing nodes; and
in response to verifying that approval of the proposed transaction has been obtained from at least a threshold number of computing nodes of the plurality of computing nodes, initiate execution of the second computer-executable code on the hosted computing environment as invocation of the smart contract on the blockchain.

Clause 10. The computing system of clause 9, wherein the one or more of the plurality of computing nodes includes the first computing node.

Clause 11. The computing system of clause 9, wherein the computer-executable code is identified within the blockchain.

Clause 12. The computing system of clause 9, wherein the computer-executable code is hosted by the hosted computing environment, and wherein the hosted computing environment verifies immutability of the computer-executable code.

Clause 13. The computing system of clause 9, wherein execution of the computer-executable further causes the system to verify a result of the execution of the second computer-executable code, wherein verifying the result includes identifying, within the result, a digital signature of the hosted computing environment that authenticates the execution.

Clause 14. The computing system of clause 9, wherein the computer-executable code is a serverless function, and wherein the execution of the computer-executable code is an execution of the computer-executable code on a serverless compute system of the hosted computing environment.

Clause 15. The computing system of clause 9, wherein to initiate execution of the second computer-executable code on the hosted computing environment as invocation of the smart contract on the blockchain, execution of the computer-executable further causes the system causes the system to transmit an instruction to a second computing node in the plurality of computing nodes to execute the second computer-executable code.

Clause 16. One or more non-transitory computer-readable media comprising computer-executable code, wherein the computer-executable code, when executed by one or more processors of a first computing node of a plurality of computing nodes implementing a blockchain, causes the first computing node to:

obtain a proposed transaction to the blockchain, the proposed transaction including invocation of a smart contract, wherein the smart contract corresponds to second computer-executable code hosted by a hosted computing environment that verifies immutability of the second computer-executable code;

obtain approval of the proposed transaction from at least a portion of the plurality of computing nodes, wherein approval from an individual computing node of the proposed transaction indicates approval for the first computing node to execute the smart contract on behalf of the individual computing node;

verify that approval of the proposed transaction has been obtained from at least a threshold number of computing nodes of the plurality of computing nodes; and in response to verifying that approval of the proposed transaction has been obtained from at least a threshold number of computing nodes of the plurality of computing nodes, initiate execution of the second computer-executable code on the hosted computing environment as invocation of the smart contract on the blockchain.

Clause 17. The one or more non-transitory computer-readable media of clause 16, wherein the threshold number of computing nodes is a quorum of less than all computing nodes.

Clause 18. The one or more non-transitory computer-readable media of clause 16, wherein the threshold number of computing nodes is defined within the blockchain.

Clause 19. The one or more non-transitory computer-readable media of clause 16, wherein the computer-executable code is stored at a hosted computing environment that verifies immutability of the computer-executable code.

Clause 20. The one or more non-transitory computer-readable media of clause 16, wherein the proposed transaction identifies one or more parameters values to be passed to the execution of the second computer-executable code, and wherein the computer-executable code further causes the first computing node to verify immutability of the one or more parameters at least between approval of proposed transaction and obtaining a result of the execution of the second computer-executable code.

Clause 21. The one or more non-transitory computer-readable media of clause 16, wherein the one or more parameter values are values stored within the blockchain.

Clause 22. The one or more non-transitory computer-readable media of clause 16, wherein the computer-executable code, when executed by the one or more processors of the first computing node, further causes the first computing node to identify the plurality of computing nodes from the blockchain.

Clause 23. The one or more non-transitory computer-readable media of clause 16, wherein the computer-executable code, when executed by the one or more processors of the first computing node, further causes the first computing node to identify the plurality of computing nodes from the blockchain.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

Additional details regarding some embodiments of the present disclosure are provided by the attached appendices. Statements made in the attached appendices should be understood to apply to the embodiments discussed in the respective appendix, and should not be construed as applying to all embodiments of the present disclosure.

What is claimed is:

1. A computer-implemented method to efficiently append blocks to a blockchain, the computer-implemented method implemented at a first computing node of a plurality of computing nodes implementing the blockchain, the computer-implemented method comprising:

executing, on a hosted computing environment, computer-executable code hosted by the hosted computing environment, wherein the hosted computing environment verifies immutability of the computer-executable code, and wherein the computer-executable code, when executed on the hosted computing environment:

obtains one or more proposed data transactions to the blockchain, each proposed data transaction including one or more modifications to data stored in a distributed ledger represented by the blockchain;

obtains approval of the one or more proposed data transactions from at least a portion of the plurality of computing nodes, wherein approval from an individual computing node of the one or more proposed data transactions indicates approval from the individual computing node for the first computing node executing the verifiably immutable code to select, on behalf of the individual computing node, the one or more proposed data transactions for inclusion in a next block appended to the blockchain;

verifies that approval of the one or more proposed data transactions has been obtained from at least a threshold number of computing nodes of the plurality of computing nodes; and in response to verifying that approval of the one or more proposed data transactions has been obtained from at least the threshold number of computing nodes of the plurality of computing nodes, transmits to the plurality of computing nodes an indication that the one or more proposed data transactions have been approved, wherein individual computing nodes of the plurality of computing nodes are configured to respond to the indication from the first computing node executing the verifiably immutable code by appending to the blockchain the next block including the one or more proposed data transactions without independently verifying that approval of the one or more proposed data transactions has been obtained from at least the threshold number of computing nodes, wherein the computer-executable code hosted by the hosted computing environment is identified within a non-initial block the blockchain, and wherein the non-initial block of the blockchain indicates approval of a transition to the computer-executable code from a prior set of computer-executable code that is identified within an initial block the blockchain.

2. The computer-implemented method of claim 1 further comprising, at one or more of the plurality of computing nodes:
validating the one or more proposed transactions against transaction rules stored within the blockchain; and
submitting approval of the one or more proposed transactions to the first node.

3. The computer-implemented method of claim 2, wherein the one or more of the plurality of computing nodes includes the first computing node.

4. The computer-implemented method of claim 1, wherein the computer-executable code hosted by the hosted computing environment is identified within the blockchain by at least one of a hash value of the code or a unique identifier of the code on the hosted computing environment.

5. A computing system comprising:
a data store of a hosted computing environment, the data store storing computer-executable code hosted by the hosted computing environment, wherein the hosted computing environment verifies immutability of the computer-executable code; and
one or more hardware processors of the hosted computing environment configured to execute the computer-executable code, wherein execution of the computer-executable code by the one or more processors causes the system, acting as a first computing node a plurality of computing nodes implementing a blockchain, to:
obtain one or more proposed data transactions to a blockchain, each proposed data transaction including one or more modifications to data stored in the blockchain;
obtain approval of the one or more proposed data transactions from at least a portion of the plurality of computing nodes, wherein approval from an individual computing node of the one or more proposed data transactions indicates approval from the individual computing node for the first computing node to select, on behalf of the individual computing node, the one or more proposed data transactions for inclusion in a next block appended to the blockchain;
verify that approval of the one or more proposed data transactions has been obtained from at least a threshold number of computing nodes of the plurality of computing nodes; and
in response to verifying that approval of the one or more proposed data transactions has been obtained from at least the threshold number of computing nodes of the plurality of computing nodes, cause the one or more proposed data transactions to be added to the blockchain as a next block of the blockchain,
wherein the computer-executable code hosted by the hosted computing environment is identified within a non-initial block the blockchain, and wherein the non-initial block of the blockchain indicates approval of a transition to the computer-executable code from a prior set of computer-executable code that is identified within an initial block the blockchain.

6. The computing system of claim 5, wherein causing the one or more proposed transactions to be added to the blockchain as the next block of the blockchain includes transmitting an instruction to the plurality of computing nodes to add the one or more proposed transactions to the blockchain as the next block, and wherein individual computing nodes of the plurality of computing nodes are configured to respond to the instruction from the first computing node executing the verifiably immutable code by appending to the blockchain the next block including the one or more proposed data transactions without independently verifying that approval of the one or more proposed data transactions has been obtained from at least the threshold number of computing nodes.

7. The computing system of claim 6, wherein the instruction to the plurality of computing nodes to add the one or more proposed transactions to the blockchain as the next block includes a digital signature of the hosted computing environment that authenticates the execution of the computer-executable code.

8. The computing system of claim 5, wherein the computer-executable code is a serverless function, and wherein the execution of the computer-executable code is an execution of the computer-executable code on a serverless compute system of the hosted computing environment.

9. The computing system of claim 5, wherein the threshold number of computing nodes is all computing nodes.

10. The computing system of claim 5, wherein the threshold number of computing nodes is a quorum of less than all computing nodes.

11. The computing system of claim 5, wherein the threshold number of computing nodes is defined within the blockchain.

12. The computing system of claim 5, wherein execution of the computer-executable code by the one or more processors further causes the system to validate the one or more proposed transactions against transaction rules stored within the blockchain.

13. The computing system of claim 12, wherein the transaction rules stored within the blockchain define a permitted format of data stored within a distributed ledger represented by the blockchain.

14. One or more non-transitory computer-readable media comprising computer-executable code hosted by a hosted computing environment, wherein the hosted computing environment verifies immutability of the computer-executable code, and wherein the computer-executable code, when executed by one or more processors of the hosted computing environment acting as a first computing node of a plurality of computing nodes implementing a blockchain, causes the hosted computing environment to:
obtain one or more proposed data transactions to the blockchain, each proposed data transaction including one or more modifications to data stored in the blockchain;
obtain approval of the one or more proposed data transactions from at least a portion of the plurality of computing nodes, wherein approval from an individual computing node of the one or more proposed data transactions indicates approval from the individual computing node for the first computing node to select, on behalf of the individual computing node, the one or more proposed data transactions for inclusion in a next block appended to the blockchain;

verify that approval of the one or more proposed data transactions has been obtained from at least a threshold number of computing nodes of the plurality of computing nodes; and in response to verifying that approval of the one or more proposed data transactions has been obtained from at least the threshold number of computing nodes of the plurality of computing nodes, cause the one or more proposed data transactions to be added to the blockchain as a next block of the blockchain, wherein the computer-executable code hosted by the hosted computing environment is identified within a non-initial block the blockchain, and wherein the non-initial block of the blockchain indicates approval of a transition to the computer-executable code from a prior set of computer-executable code that is identified within an initial block the blockchain.

15. The one or more non-transitory computer-readable media of claim 14, wherein the computer-executable code, when executed by the one or more processors of the hosted computing environment acting as the first computing node of the plurality of computing nodes, further causes the hosted computing environment to identify the plurality of computing nodes from the blockchain.

16. The one or more non-transitory computer-readable media of claim 14, wherein the computer-executable code, when executed by the one or more processors of the hosted computing environment acting as the first computing node of the plurality of computing nodes, further causes the hosted computing environment to identify the plurality of computing nodes from the blockchain as a subset, of computing nodes participating in the blockchain, with permissions to view one or more data objects modified by the one or more proposed transactions.

17. The one or more non-transitory computer-readable media of claim 14, wherein the computer-executable code, when executed by the one or more processors of the hosted computing environment acting as the first computing node of the plurality of computing nodes, further causes the hosted computing environment to cause one or more metrics regarding operation of the first computing to be added to the blockchain in the next block of the blockchain.

18. The one or more non-transitory computer-readable media of claim 14, wherein the one or more transactions include a modification to rules stored within the blockchain that modify subsequent operation of the first computing node.

19. The one or more non-transitory computer-readable media of claim 14, wherein the one or more transactions include addition of a confidential data value to the blockchain, and wherein causing the one or more proposed transactions to be added to the blockchain as the next block of the blockchain includes adding to the next block at least one of a token representation of the confidential data value or an encrypted version of the confidential data value.

20. The one or more non-transitory computer-readable media of claim 14, wherein a prior block of the blockchain includes a confidential data value, and wherein causing the one or more proposed transactions to be added to the blockchain as the next block of the blockchain includes cryptographically linking the next block to the prior block based at least partly on a representation of the prior block excluding the confidential data value.

* * * * *